US008734703B2

(12) United States Patent
Havens et al.

(10) Patent No.: US 8,734,703 B2
(45) Date of Patent: May 27, 2014

(54) METHODS AND SYSTEMS FOR FABRICATING COMPOSITE PARTS USING A SMP APPARATUS AS A RIGID LAY-UP TOOL AND BLADDER

(75) Inventors: David E. Havens, Bellbrook, OH (US); Matthew C. Everhart, Fairborn, OH (US); Thomas Wood Margraf, Centerville, OH (US); Joel James Everhart, Xenia, OH (US); Randy Rex Kysar, Derby, KS (US); Carl Ray Fiegenbaum, Rose Hill, KS (US); Jeffrey W. Priest, Rose Hill, KS (US); Delbert Leon Strelow, Wichita, KS (US); Kristin Dru Pickell, Sandy, UT (US)

(73) Assignee: Spirit AeroSystems, Inc., Wichita, KS (US)

( * ) Notice: Subject to any disclaimer, the term of this patent is extended or adjusted under 35 U.S.C. 154(b) by 383 days.

(21) Appl. No.: 13/238,775

(22) Filed: Sep. 21, 2011

(65) Prior Publication Data
US 2012/0288655 A1 Nov. 15, 2012

Related U.S. Application Data

(60) Provisional application No. 61/412,635, filed on Nov. 11, 2010, provisional application No. 61/425,435, filed on Dec. 21, 2010, provisional application No. 61/486,539, filed on May 16, 2011.

(51) Int. Cl.
*B28B 7/30* (2006.01)
(52) U.S. Cl.
USPC ........................................... 264/313; 264/531
(58) Field of Classification Search
USPC ................................................ 264/313, 531
See application file for complete search history.

(56) References Cited

U.S. PATENT DOCUMENTS 3,425,642 A 2/1969 May
3,764,641 A 10/1973 Ash
(Continued)

FOREIGN PATENT DOCUMENTS

CN 101041269 9/2007
CN 101055344 10/2007
(Continued)

OTHER PUBLICATIONS

Essemplex Thermoplastic Shape Memory Polymer Resin; Product Data Sheet; Copyright 2007. CRG Industries; http://www.crg-industries.com/datasheets/Essemplex%20data%20sheet.pdf.

(Continued)

*Primary Examiner* — Michael C Miggins
(74) *Attorney, Agent, or Firm* — Hovey Williams LLP

(57) ABSTRACT

A method and apparatus for fabricating a composite part with a shape memory polymer (SMP) apparatus usable as both a rigid lay-up tool and as a bladder. The SMP apparatus may be heated until malleable, shaped, and then cooled in a desired rigid tool configuration. For example, cavities may be formed into the SMP apparatus for nesting components therein to co-bond or co-cure with the composite part. The composite material may be applied onto the SMP apparatus in the rigid tool configuration and then placed into a rigid external tool and heated to composite cure temperatures at which the SMP apparatus is malleable. A pressure differential may be induced which urges the SMP apparatus to compress the composite material against the rigid external tool. When the composite material is cured, the SMP apparatus may be urged away from the cure composite material and removed from within the composite part.

14 Claims, 11 Drawing Sheets

(56) References Cited

U.S. PATENT DOCUMENTS

| | | |
|---|---|---|
| 4,632,328 A | 12/1986 | Bishop et al. |
| 5,049,591 A | 9/1991 | Hayashi et al. |
| 5,057,252 A | 10/1991 | Kagawa et al. |
| 5,098,776 A | 3/1992 | Kobayashi et al. |
| 5,128,197 A | 7/1992 | Kobayashi et al. |
| 5,139,832 A | 8/1992 | Hayashi et al. |
| 5,151,277 A | 9/1992 | Bernardon et al. |
| 5,168,635 A | 12/1992 | Hoffman |
| 5,445,342 A | 8/1995 | Miller et al. |
| 5,546,784 A | 8/1996 | Haas et al. |
| 5,846,464 A | 12/1998 | Hoffman |
| 5,851,563 A | 12/1998 | Hoffman |
| 5,914,081 A | 6/1999 | Shevchuk |
| 5,954,175 A | 9/1999 | Haas et al. |
| 6,012,314 A | 1/2000 | Sullivan et al. |
| 6,053,026 A | 4/2000 | Nardiello et al. |
| 6,083,442 A | 7/2000 | Gabilly |
| 6,102,933 A | 8/2000 | Lee et al. |
| 6,160,084 A | 12/2000 | Langer et al. |
| 6,363,767 B1 | 4/2002 | Papazian et al. |
| 6,370,757 B2 | 4/2002 | Lee et al. |
| 6,388,043 B1 | 5/2002 | Langer et al. |
| 6,701,764 B2 | 3/2004 | Bruck et al. |
| 6,720,402 B2 | 4/2004 | Langer et al. |
| 6,759,481 B2 | 7/2004 | Tong |
| 6,827,325 B2 | 12/2004 | Hofmann et al. |
| 6,830,712 B1 | 12/2004 | Roffman et al. |
| 6,852,825 B2 | 2/2005 | Lendlein et al. |
| 6,858,680 B2 | 2/2005 | Gunatillake et al. |
| 6,910,714 B2 | 6/2005 | Browne et al. |
| 6,920,675 B2 | 7/2005 | Browne et al. |
| 6,979,050 B2 | 12/2005 | Browne et al. |
| 6,986,855 B1 | 1/2006 | Hood et al. |
| 6,991,280 B2 | 1/2006 | McKnight et al. |
| 7,013,536 B2 | 3/2006 | Golden et al. |
| 7,029,044 B2 | 4/2006 | Browne et al. |
| 7,029,056 B2 | 4/2006 | Browne et al. |
| 7,032,282 B2 | 4/2006 | Powell et al. |
| 7,059,664 B2 | 6/2006 | Aase et al. |
| 7,060,140 B2 | 6/2006 | Cheng et al. |
| 7,063,377 B2 | 6/2006 | Brei et al. |
| 7,067,606 B2 | 6/2006 | Mather et al. |
| 7,091,297 B2 | 8/2006 | Mather et al. |
| 7,105,117 B2 | 9/2006 | Rodgers et al. |
| 7,108,316 B2 | 9/2006 | Barvosa-Carter et al. |
| 7,118,652 B2 | 10/2006 | McKnight et al. |
| 7,146,690 B2 | 12/2006 | Stanford, Jr. et al. |
| 7,147,269 B2 | 12/2006 | Aase et al. |
| 7,147,271 B2 | 12/2006 | Aase et al. |
| 7,178,859 B2 | 2/2007 | Browne et al. |
| 7,188,498 B2 | 3/2007 | Browne et al. |
| 7,200,902 B2 | 4/2007 | Browne et al. |
| 7,204,472 B2 | 4/2007 | Jones et al. |
| 7,217,744 B2 | 5/2007 | Lendlein et al. |
| 7,252,313 B2 | 8/2007 | Browne et al. |
| 7,267,367 B2 | 9/2007 | Barvosa-Carter et al. |
| 7,276,195 B1 | 10/2007 | Tong |
| 7,284,786 B2 | 10/2007 | Browne et al. |
| 7,308,738 B2 | 12/2007 | Barvosa-Carter et al. |
| 7,309,104 B2 | 12/2007 | Browne et al. |
| 7,331,616 B2 | 2/2008 | Brei et al. |
| 7,332,688 B2 | 2/2008 | Browne et al. |
| 7,350,851 B2 | 4/2008 | Barvosa-Carter et al. |
| 7,370,894 B2 | 5/2008 | Browne et al. |
| 7,392,876 B2 | 7/2008 | Browne et al. |
| 7,401,845 B2 | 7/2008 | Alexander et al. |
| 7,401,846 B2 | 7/2008 | Browne et al. |
| 7,422,714 B1 | 9/2008 | Hood et al. |
| 7,429,074 B2 | 9/2008 | McKnight et al. |
| 7,448,678 B2 | 11/2008 | Browne et al. |
| 7,455,147 B2 | 11/2008 | Brei et al. |
| 7,478,845 B2 | 1/2009 | Mankame et al. |
| 7,480,975 B2 | 1/2009 | Verbrugge et al. |
| 7,484,735 B2 | 2/2009 | Verbrugge et al. |
| 7,498,926 B2 | 3/2009 | Browne et al. |
| 7,500,704 B2 | 3/2009 | Herrera et al. |
| 7,538,472 B2 | 5/2009 | Browne et al. |
| 7,556,117 B2 | 7/2009 | Browne et al. |
| 7,556,313 B2 | 7/2009 | Browne et al. |
| 7,587,805 B2 | 9/2009 | Browne et al. |
| 7,591,834 B2 | 9/2009 | Buckley et al. |
| 7,594,259 B1 | 9/2009 | Audet et al. |
| 7,594,697 B2 | 9/2009 | Browne et al. |
| 7,597,616 B2 | 10/2009 | Browne et al. |
| 7,601,274 B2 | 10/2009 | Mather et al. |
| 7,607,634 B2 | 10/2009 | Browne et al. |
| 7,607,717 B2 | 10/2009 | Browne et al. |
| 2003/0055198 A1 | 3/2003 | Langer et al. |
| 2004/0011525 A1 | 1/2004 | Jones et al. |
| 2004/0014929 A1 | 1/2004 | Lendlein et al. |
| 2004/0015187 A1 | 1/2004 | Lendlein et al. |
| 2004/0033515 A1 | 2/2004 | Cao et al. |
| 2004/0033553 A1 | 2/2004 | Littarru et al. |
| 2005/0211870 A1 | 9/2005 | Browne et al. |
| 2005/0212630 A1 | 9/2005 | Buckley et al. |
| 2005/0244353 A1 | 11/2005 | Lendlein et al. |
| 2006/0115799 A1 | 6/2006 | Stephen et al. |
| 2006/0116503 A1 | 6/2006 | Lendlein et al. |
| 2006/0140999 A1 | 6/2006 | Lendlein et al. |
| 2006/0287710 A1 | 12/2006 | Lendlein et al. |
| 2007/0088135 A1 | 4/2007 | Lendlein et al. |
| 2007/0129784 A1 | 6/2007 | Lendlein et al. |
| 2008/0021166 A1 | 1/2008 | Tong et al. |
| 2008/0021188 A1 | 1/2008 | Tong et al. |
| 2008/0023890 A1 | 1/2008 | Sherman et al. |
| 2008/0085946 A1 | 4/2008 | Mather et al. |
| 2008/0228028 A1 | 9/2008 | Carlson et al. |
| 2008/0236720 A1 | 10/2008 | Sigler et al. |
| 2008/0262188 A1 | 10/2008 | Xie et al. |
| 2008/0269420 A1 | 10/2008 | Tong et al. |
| 2008/0272615 A1 | 11/2008 | McKnight et al. |
| 2008/0314510 A1 | 12/2008 | Hood |
| 2008/0315466 A1 | 12/2008 | Hood et al. |
| 2009/0023827 A1 | 1/2009 | Lendlein |
| 2009/0036627 A1 | 2/2009 | Lendlein et al. |
| 2009/0047489 A1 | 2/2009 | Grummon et al. |
| 2009/0065650 A1 | 3/2009 | McKeon et al. |
| 2009/0092807 A1 | 4/2009 | Hu et al. |
| 2009/0095865 A1 | 4/2009 | Everhart et al. |
| 2009/0131604 A1 | 5/2009 | Lendlein |
| 2009/0163664 A1 | 6/2009 | Lendlein et al. |
| 2009/0176896 A1 | 7/2009 | Lendlein |
| 2009/0240075 A1 | 9/2009 | Mather et al. |

FOREIGN PATENT DOCUMENTS

| | | |
|---|---|---|
| EP | 2075279 | 1/2009 |
| WO | WO2005108448 | 11/2005 |
| WO | WO2005118248 | 12/2005 |
| WO | WO2006046974 | 5/2006 |
| WO | WO2007001407 | 1/2007 |
| WO | WO2007002161 | 1/2007 |
| WO | WO2007070877 | 6/2007 |
| WO | WO2008051241 | 5/2008 |
| WO | WO2008108863 | 9/2008 |
| WO | WO2009002586 | 12/2008 |

OTHER PUBLICATIONS

CRG—Veriflex Shape Memory Polymer; Advanced materials Portfolio; Veriflex Shape Memory Polymer; http://verilyte.com/technology/materialsportfolio/veriflex.shtml; Copyright 2003-2011 Cornerstone Research Group, Inc. Copyright Dec. 12, 2003.

SAO/NASA ADS Physics Abstract Service; Shape Memory Polymer Configurative Tooling; http://adsabs.harvard.edu/abs/2004SPIE.5388...87E; Published Jul. 2004.

CM; Composites Manufacturing; The Official magazine of the American Composites Manufacturers Association; Article: Trapped Tooling; Building the Unbuildable, New designs, new tooling materials, new approaches. By: Linda Clements; Published Jun. 2005.

AFRL-ML-WP-TP-2006-406; "High-Temperature Reuasable Shape Memory Polymer Mandrels" (Preprint); By: Matthew C. Everhart and Beth A. Knapp; Mar. 2006; Airforce Research Laboratory.

(56) References Cited

OTHER PUBLICATIONS

Scientific Paper; "High-Temperature Reusable Shape Memory Polymer Mandrels"; By: Matthew C. Everhart, DaAnna L. Harris, David M. Nickerson and Richard D. Hreha; Cornerstone Research Group, Inc., 2750 Indian Ripple Road, Dayton, Ohio 45440; Published Mar. 30, 2006.

High-Performance Composites; Design and Manufacturing Solutions for Industry; Published Jul. 2006; www.compositesworld.com; "New tooling concepts spur innovation."

Article from High-Performance Composites Jul. 2006; By: Sara Block; Tooling and Toolmaking Innovations Continue; Posted Jul. 1, 2006; Tooling and Toolmaking Innovations Continue : Composites World.

American Composites Manufacturers Association (ACMA)—Feature: Article : "Morphing: The Shape of Wings to Come" By: Chris Red; Published Jul. 26, 2006; http://www.acmanet.org/CM/0706/feature_d0706.cfm.

E-news; National Composites Network; "Cornerstone Research Group: Shape Memory Polymers"; NCN website: www.ncn-uk.co.uk; Published Sep. 2006.

CRG Industries; For Immediate Release; Published Jan. 22, 2007; "CRG Industries presents our award-winning Smart-Mandrels Tubes, winner of SPIE 2005 Smart materials and Structures Award."

Materials Science and Technology Polymers; Shape memory polymers detect changes in temperature or light level; Technical Contact: Linda Domeier; Science Matter Contact: Alan Burns, Ph.D.; Published Jun. 2007; LDRD: Laboratory Directed Research and Development; Sandia National Laboratories.

SAMPE 2007 Baltimore : Composites World; SAMPE 2007 Baltimore; The SAMPE Symposium's cross-country move proves a welcome boon to East Coast suppliers and composites professionals; Article From: High-Performance Composites Jul. 2007; Staff; Posted on Jul. 1, 2007; http://www.compositesworld.com/articles/sampe-2007-baltimore.

Shape memory Polymer Bladder Tooling; Navy SBIR RY2008.1; http://www.navysbir.com/08_1/81.htm; published Jul. 13, 2007.

CRG—SMP Bladders; Manufacturing Technology Portfolio; Shape Memory Polymer (SMP) Bladders for Composites Manufacturing; http://www.crgrp.com/technology/mantechportolio/smp-bladders.shtml; Published Jul. 13, 2007.

SAMPE Fall Technical Conference and Exhibition; Oct. 29-Nov. 1, 2007; Cincinnati, Ohio,Cincinnati Hilton Netherland Plaza, Sponsored by SAMPE's Midwest Chapter; From Art to Science: Advancing Materials and Process Engineering; Published Jul. 19, 2007.

Reinforced Plastics—Preview: Composites 2007; Reinforced Plastics.com; Feature Preview: Composites 2007; Aug. 31, 2007; Reinforced Plastics; http://www.reinforcedplastics.com/view/3605/preview-composites-2007-/; p. 4.

Elastic Memory Composite (EMC) Material; Composite Technology Development, Inc: Engineered Material Solutions; Products; TEMBO Shape Memory Polymers and Elastic Memory Composites; http://www.ctd_materials.com/products/emc.htm; Published Oct. 2, 2007.

Technical Paper : Model Development for Shape Memory Polymers; Ryan D. Siskind and Ralph C. Smith; Department of Mathematics; North Carolina State University; Raleigh, NC 27695; Published 2008; http://www.ncsu.edu/crsc/reports/ftp/pdf/crsc-tr08-04.pdf.

Paper : Shape Memory Polymers; Published Oct. 8, 2008; http://www.plasticsprojects.org/Shape%20Memory%2010-12.pdf.

CRG—Shape Memory Polymer Nanocomposites: Multifunctional Materials for Revolutionary Applications; Power Point Presentation; Published Mar. 17, 2005.

SMP Bladders : Advanced Composite Tooling : Operate first as mandrels and later as inflatable bladders; CRG sales sheet: Copyright 2007.

METHODS AND SYSTEMS FOR FABRICATING COMPOSITE PARTS USING A SMP APPARATUS AS A RIGID LAY-UP TOOL AND BLADDER

RELATED APPLICATIONS

This non-provisional patent application claims priority benefit to earlier-filed U.S. provisional patent application titled "Bladder Style Reconfigurable Tooling" Ser. No. 61/412,635, filed Nov. 11, 2010, hereby incorporated in its entirety by reference into the present application. The present application also claims priority benefit to earlier-filed U.S. provisional patent application titled "Bladder Style Reconfigurable Tooling" Ser. No. 61/425,435, filed Dec. 21, 2010, hereby incorporated in its entirety by reference into the present application. Additionally, this application claims priority benefit to earlier-filed U.S. provisional patent application titled "Methods and Systems for Fabricating Composite Parts with SMP Mandrels/Bladders" Ser. No. 61/486,539, filed May 16, 2011, hereby incorporated in its entirety by reference into the present application.

BACKGROUND

1. Field

The present invention relates to systems and methods for using a reusable apparatus made of shape memory polymer (SMP) to fabricate composite parts.

2. Related Art

Composite parts, such as those used in the manufacture of aircraft, can be constructed using various production methods, such as filament winding, tape placement, overbraid, chop fiber roving, coating, hand lay up, or other composite processing techniques and curing processes. Most of these processes use a rigid cure tool/mandrel on which composite material is applied and then cured into a rigid composite part. Removing the rigid cure tool or mandrel from the cured composite part is generally difficult, costly, and/or time-consuming, particularly if the resulting composite part has trapping geometry that precludes easy part removal. One known method of removing the mandrel requires sacrificing or destroying the mandrel by cutting, dissolving, bead-blasting, or otherwise breaking down the mandrel into smaller pieces which can be removed from within the composite part. Destroying the mandrel obviously prevents it from being used again for subsequent parts and can be damaging to an inner surface of the composite part.

Another method uses a segmented mandrel that can be disassembled and removed after the composite part is cured. However, these mandrels are expensive and require a great amount of time to install and remove. Furthermore, these segmented mandrels are typically each designed to fabricate a specific composite part and are not easily reconfigured to be used in the manufacture of other composite parts.

Yet another method uses inflatable mandrels that can be removed by deflating them after the composite part is cured. However, this method typically involves balloon-like mandrels that can only be used as a bagging aid due to their relative lack of strength and rigidity during composite lay-up.

Another alternative method involves a silicon-coated foam tooling or mandrel. This foam tooling may be covered with a silicon bag and then wrapped with uncured composite material. During cure, the silicon bag is inflated and the foam tooling melts. After cure, the silicon bag may be removed and reused. However, the foam tooling is not reusable, so a new foam tooling must be machined out of new foam each cure cycle.

Accordingly, there is a need for improved methods of fabricating composite parts.

SUMMARY

Embodiments of the present invention provide methods of fabricating composite parts using shape memory polymer (SMP) apparatuses. One exemplary method may comprise applying composite material to at least a portion of an SMP apparatus, triggering a change in modulus of the SMP apparatus from a rigid state to a malleable state, heating the composite material to a composite material cure temperature, and inducing a pressure differential that drives the SMP apparatus, in its malleable state, toward the composite material before and/or during cure to compress the composite material against a rigid mold. The change in modulus may be triggered by applying at least one of temperature change, an electric current, water, and light to the SMP apparatus. Once the cure is complete, pressure may be released and the SMP apparatus may be removed from within the resulting cured composite part.

Another exemplary method of fabricating a composite part may comprise the steps of applying composite material onto at least a portion of a SMP apparatus, placing the composite material and SMP apparatus into a cavity within a rigid molding tool, such that at least a portion of the composite material rests against the rigid molding tool, placing an impermeable sheet of material over the composite material and SMP apparatus, and sealing the impermeable sheet of material to the rigid molding tool and/or the SMP apparatus. Next, this method may comprise heating the composite material to a composite material cure temperature, triggering the SMP apparatus to change in modulus from a rigid state to a malleable state, and inducing a pressure differential sufficient to drive the impermeable sheet of material and the SMP apparatus, in the malleable state, toward the composite material, thereby compressing at least a portion of the composite material against the rigid mold before and during curing of the composite material into the composite part.

In yet another embodiment of the present invention, a method of fabricating a composite part with integrated stiffeners may comprise the steps of triggering a SMP apparatus to a malleable state, shaping an SMP apparatus in the malleable state to correspond with a desired configuration of a first surface of the composite part to be fabricated, including shaping the SMP apparatus to have one or more cavities configured for placement of stiffeners therein, triggering the SMP apparatus to a rigid state, placing the stiffeners into the cavities, applying composite material onto the SMP apparatus and exposed surfaces of the stiffeners resting within the cavities, and co-curing or co-bonding the stiffeners with the composite material on the SMP apparatus via pressure and heat to fabricate the composite part.

In another embodiment of the present invention, a method of removing a SMP apparatus from within a cured composite part may comprise the steps of triggering the SMP apparatus from a rigid state to a malleable state, inducing a pressure differential that drives the SMP apparatus, in the malleable state, away from the cured composite part and toward an inner mandrel tool, and removing the inner mandrel tool with the SMP apparatus resting thereon out of the cured composite part. The inner mandrel tool may comprise an outer surface having varying contours such that a surface area of the outer surface is great enough to prevent the SMP apparatus from folding over onto itself or creasing when driven toward the inner mandrel tool. A maximum straight line distance between points on the outer surface may be small enough to allow the inner mandrel tool clearance for removal from the cured composite part.

In yet another embodiment of the present invention, a method of fabricating a composite part with integrated stiffeners may comprise the steps of shaping or casting a SMP apparatus to correspond with a desired configuration of a first surface of the composite part to be formed, shaping or casting the SMP apparatus to include one or more cavities configured for placement of the stiffeners therein, placing the stiffeners into the cavities, applying composite material onto the SMP apparatus and exposed surfaces of the stiffeners resting within the cavities and co-curing or co-bonding the stiffeners with the composite material on the SMP apparatus via pressure and heat to fabricate the composite part. In this embodiment of the invention, the SMP apparatus may remain in a rigid state throughout the co-curing or co-bonding of the stiffeners with the composite material.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
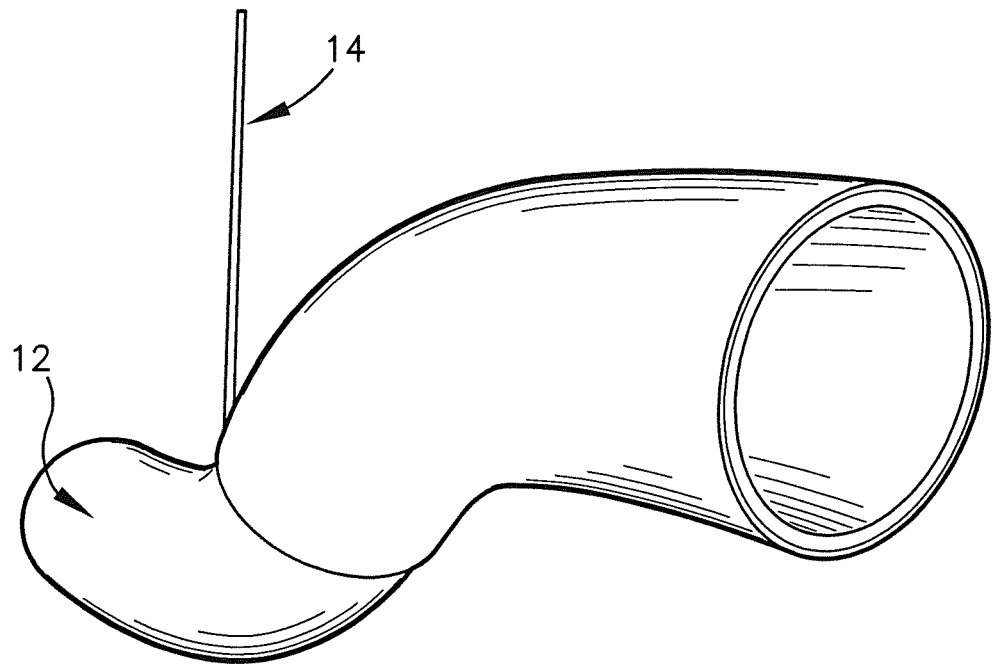
FIG. 1 is a perspective view of an SMP apparatus constructed in accordance with an embodiment of the present invention and shown used as a mandrel with composite material placed thereon.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Making Composite Parts with an SMP Apparatus

Figure 2:
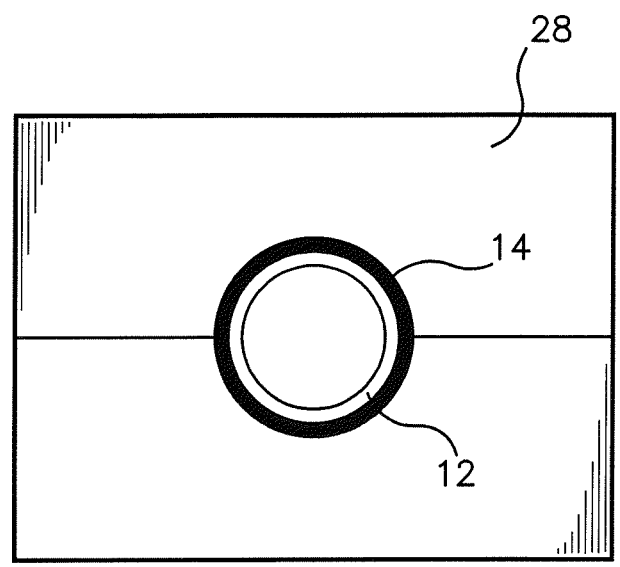
FIG. 2 is a vertical cross-sectional elevation view of the SMP apparatus of FIG. 1, with the SMP apparatus inflated outward to act as a bladder, pressing the composite material thereon toward an external mold.

One embodiment of the present invention is a method for making composite parts. This embodiment of the invention may be implemented with a shape memory polymer (SMP) apparatus 12, as best shown in FIGS. 1-2, and/or a rigid external tool 28, as later described herein and illustrated in FIG. 2. The SMP apparatus 12 may be used as both a mandrel or rigid tooling for applying composite material 14 thereon, as illustrated in FIG. 1, and a bladder for providing outward pressure to the composite material 14 during a cure of the composite material 14 into a hardened composite part, as illustrated in FIG. 2.

The SMP apparatus 12 may be formed of SMP material cast into any memory shape. For example, the SMP apparatus 12 may be cast into an elongated and/or hollow configuration having one or more open ends using any method known in the art, such as methods of forming an SMP cylinder disclosed in U.S. Pat. No. 7,422,714, incorporated by reference herein in its entirety. For example, the SMP apparatus 12 may be a pre-formed SMP cylinder or barrel open at two opposing ends. Alternatively, the SMP apparatus 12 may have any cross-sectional shape, such as a trapezoid, rectangle, square, or triangle, or may be cast into a non-hollow configuration. The cast shape of the SMP apparatus is referred to herein as its memory shape.

The SMP material used to form the SMP apparatus 12 may be reinforced or unreinforced SMP material. Specifically, the SMP material used to form the SMP apparatus 12 may be an epoxy, an epoxy-based SMP, a styrene copolymer based SMP or any other type or combination of SMPs, such as cyanate ester, polyurethane, polyethylene homopolymer, styrene-butadiene, polyisoprene, copolymers of stearyl acrylate and acrylic acid or methyl acrylate, norbonene or dimethaneoctahydronapthalene homopolymers or copolymers, and malemide. For example, the SMP material used in the SMP apparatus 12 may be any of the SMPs described in U.S. Pat. No. 7,422,714, U.S. Pat. No. 6,986,855, U.S. Pat. No. 7,276,195, U.S. Patent Application Publication No. 2008/0021188, U.S. Patent Application Publication No. 2008/0021166, and/or U.S. Patent Application Publication No. 2008/0269420, all of which are incorporated herein in their entireties by reference. However, numerous other types of SMPs exist and can be tailored to meet specific tolerances and temperature requirements.

The modulus of various SMP materials can be changed through several different methods, such as a temperature change, an electric current, water, and/or light. However, the exemplary methods described herein disclose the use of temperature changes to transform the SMP apparatus 12 from a malleable state to a rigid state and vice versa. Nevertheless, any of the above-listed triggers for changing the modulus of the SMP material of the SMP apparatus 12 may be used for the composite part fabrication methods described herein without departing from the scope of the invention.

A glass transition temperature ($T_g$) of an SMP material is defined herein as a threshold temperature at and/or above which that SMP material begins to transition to a lower modulus state, becoming soft and/or malleable in order to be deformed. Therefore, the SMP apparatus 12 of the present invention may be configured to begin to become flexible and formable when it is heated above its $T_g$ and to become rigid when cooled to a temperature below its $T_g$. If the SMP apparatus 12 is deformed at a temperature above $T_g$ and then held in that deformed state as its temperature drops below $T_g$, then the SMP apparatus 12 hardens in that deformed state. When heated again, the SMP apparatus 12 may generally return to its originally-cast memory shape unless otherwise acted on by another force. While the modulus change of the SMP apparatus 12 may begin at $T_g$, there may be a range of transition temperatures through which the SMP apparatus 12 may become increasingly malleable.

The SMP apparatus 12 may be made of an SMP material having any $T_g$ appropriate for the uses and methods described herein. In some embodiments of the invention, $T_g$ may be equal to or less than the curing temperature for the composite material 14, such that the SMP apparatus 12 may be used as an expandable bladder during curing of the composite part. In other embodiments of the invention, $T_g$ may be greater than the curing temperature for the composite material 14 such that the SMP apparatus 12 remains rigid during cure of the composite part.

While the SMP apparatus 12 may be designed to have any $T_g$, in some example embodiments of the invention, $T_g$ may be a temperature between 100° F. and 700° F. Specifically, $T_g$ may be a temperature between 100° F. and 200° F., 200° F. and 300° F., or between 300° F. and 400° F. More specifically, $T_g$ may be a temperature between 125° F. and 175° F., 250° F. and 300° F., or 350° F. and 400° F. In one embodiment of the invention, $T_g$ of the SMP apparatus 12 may be approximately equal to 143° F., 275° F., or 375° F. The SMP apparatus 12 may become increasingly malleable when heated through a transition range of temperatures beginning at or centered around $T_g$ and may gradually harden to its rigid state when cooled through the transition range of temperatures to a temperature at or below $T_g$.

The rigid external tool 28 may have any shape or configuration desired for fabricating the composite part. In some embodiments of the invention, the rigid external tool 28 may have a hollow space into which the SMP apparatus 12 and the composite material 14 may be placed. For example, the rigid external tool 28 may be a barrel tool or a clamshell tool. The rigid external tool 28, as illustrated in FIG. 2, may form an outer surface of the composite part. In alternative embodiments of the invention, the rigid external tool 28 may be replaced with any type of mold shaped and configured for forming an inner or outer surface of a composite part. In some embodiments of the invention, the rigid external tool 28 may also be used to help shape or form the SMP apparatus 12. For example, dummy skin 22, dummy internal stiffeners 23, and/or reinforcement inserts 26 may be placed in or attached to the rigid external tool 28, as described in detail below, to provide a desired mold configuration for the SMP apparatus 12.

The composite material 14 placed on the SMP apparatus 12 to form the composite part may comprise or be in the form of low temperature resin, high temperature resin, toughened resin, prepreg, wet processed fiber, dry fiber, continuous fiber, discontinuous fiber, chopped fiber, glass, KEVLAR, carbon, and/or core. Core is defined herein as any offset component separating two layers of composite material. For example, core may comprise foam, thermoplastic, honeycomb materials, aluminum, fiberglass phenolic, carbon, Nomex, etc. Core may also be referred to as core panels, honeycomb core, or sandwich panel core. Furthermore, the chemical makeup of the composite material 12 may include epoxy, BMI, benzoxazine, vinyl, acrylic, polyester, polyamide, phthalonitrile, and any other similar substances known in the art. The composite material 14 may be placed onto the SMP apparatus 12 using automated fabric placement, automated fiber placement, automated filament winding, fabric placement, hand lay-up, or any other method known in the art. The composite material 14 may be configured to be hardened or cured, such as in an autoclave, out of an autoclave, via a low-temperature cure process, and/or via a high-temperature cure process.

In use, the SMP apparatus 12 may be formed into a rigid tool configuration and then the composite material 14 may be applied thereon. For example, the SMP apparatus 12 may be shaped by one or more inner molds placed inside the SMP apparatus 12 and/or one or more outer molds (such as the rigid external tool 28) placed outside of the SMP apparatus 12. The inner or outer molds may comprise any number of components integrally formed or assembled together to provide a desired shape to the SMP apparatus 12, such as the dummy skin 22, dummy internal stiffeners 23, and/or reinforcement inserts 26 placed into or onto the rigid external tool 28 in any desired configuration. However, any method of forming the SMP apparatus 12 may be used without departing from the scope of the invention.

In some embodiments of the invention, the SMP apparatus 12 may be sealed to the inner or outer molds, heated, and then pressed against the inner or outer molds. For example, the SMP apparatus 12 may be pressed against the molds by way of a pressure differential induced via inflation, vacuum, and/or any other method known in the art for urging the SMP apparatus 12 toward the mold. Specifically, the SMP apparatus 12 may be heated and inflated toward the outer mold into a configuration for forming an inner surface of a composite part. Once the SMP apparatus 12 is cooled in the rigid tool configuration, as illustrated in FIG. 1, the SMP apparatus 12 may be removed from the inner or outer molds and composite material 14 may be placed onto the SMP apparatus 12 using any method known in the art, such as fiber placement. The SMP apparatus 12 may be referred to herein as being in the "rigid tool configuration" after it is formed into the desired shape for the composite material 14 to be applied thereto.

In some embodiments of the invention, cavities 40 may be formed into the SMP apparatus 12 so that components (such as internal stiffeners like composite frames, stringers, or cores) may be placed into the cavities to be co-bonded or co-cured to the composite material 14. Then the composite material 14 may be placed over and/or onto both the SMP apparatus 12 and the components to be co-bonded or co-cured thereto. These cavities 40 may hold components to be co-bonded or co-cured to the composite material 14 in place during application of the composite material 14 without the need for any mechanical attachments. Additionally or alternatively, various restraints may be used to keep the internal stiffeners in place during application of the composite material 14. Then pressure via the SMP apparatus 12 may compress these components or internal stiffeners against the composite material during cure, thus co-curing or co-bonding them together.

Additionally or alternatively, the size and shape of the SMP apparatus 12 may be configured to allow thicker composite material 14 or additional layers of composite material 14 to be applied thereon at select locations. For example, the SMP apparatus 12 may have a portion with a smaller cross-sectional area and a portion with a larger cross-sectional area. The portion of the SMP apparatus 12 with the smaller cross-sectional area may allow for a greater amount of composite material 14 to be applied thereon. In general, the SMP apparatus 12 may be shaped and configured to provide enough clearance or offset between the SMP apparatus 12 and the rigid external tool 28 so that a desired thickness of composite material 14 and/or the internal stiffeners can fit within said offset.

Once the composite material is applied, the SMP apparatus 12 and the composite material 14 may have heat and pressure applied thereto in order to cure the composite material 14 and/or to co-cure or co-bond other components or internal stiffeners to the composite material 14. Additionally, the heat may also be used to change the modulus of the SMP apparatus 12. For example, the SMP apparatus 12 and the composite material 14 may be placed in the hollow space of the rigid external tool 28 and heated and pressurized as required for curing the composite material 14. In some embodiments, the heat used during this curing process may be greater than $T_g$ of the SMP apparatus 12, causing the SMP apparatus 12 to convert to its malleable state, and a pressure differential applied from within and/or without the SMP apparatus 12 (e.g., via autoclave) may cause the SMP apparatus 12 to be urged toward the rigid external tool 28. Specifically, the heat may transform the SMP apparatus 12 from the rigid tool configuration into a bladder configuration in which the SMP apparatus 12 becomes flexible and inflatable, acting as an internal bladder to compress the composite material 12 against the rigid external tool 28, as illustrated in FIG. 2. Additionally, in some embodiments of the invention, a small pressure differential or pressurization may be applied to the SMP apparatus 12 until its temperature exceeds $T_g$, at which point the pressure may be stepped up to the full amount of desired pressure.

The SMP apparatus 12 may therefore be used to press the composite material 14 against the rigid external tool 28 or any alternative rigid mold surface. The pressure differential, as described herein, can be induced using a variety of methods, with the SMP apparatus 12 sealed in an air-tight manner to one of the rigid tools or molds described herein, such that the SMP apparatus 12 inflates toward the composite material and/or is drawn against the composite material 14 during cure. In some embodiments of the invention, the pressure differential is introduced via autoclave.

Alternatively, in some embodiments of the invention, a vacuum bag or other impermeable sheet of material may be applied in such a manner to urge the SMP apparatus 12, in its malleable state, toward a rigid surface to compress the composite material 14 between the SMP apparatus 12 and the rigid surface. In this embodiment of the invention, the vacuum bag or other impermeable sheet of material may be sealed to one of the rigid tools or molds described herein, such as the rigid external tool 28. This may be particularly useful if the SMP apparatus 12 is not impermeable, comprises any holes or tears therein, and/or can not be sealed to another surface such that a pressure differential may be induced between the SMP apparatus 12 and the surface to which it is sealed. For example, the vacuum bag may be sealed to the rigid external tool 28 and may be used to drive the SMP apparatus 12, in its malleable state, in a desired direction by way of a pressure differential applied to the vacuum bag.

As described above, the SMP apparatus 12 may be configured to experience a change in modulus in response to triggers other than heat, such as an electric current, water, and/or light. Therefore, in some embodiments of the invention, one of the other triggers may also be applied to the SMP apparatus 12 as the composite material 14 is being cured, so that the SMP apparatus 12 is malleable enough to inflate or otherwise compress the composite material 14 against the rigid external tool 28.

Once the composite material 14 is cured, the pressure differential may be substantially equalized while the temperature is maintained above $T_g$, and then the SMP apparatus 12 in the flexible bladder configuration may be removed from within the cured composite part. Alternatively, once the composite material 14 is cured, a pressure differential sufficient to urge the SMP apparatus 12 away from the cured composite material may be induced. In some embodiments of the invention, the SMP apparatus 12 may contract back to its original or memory shape, allowing for easy removal of the SMP apparatus 12 from within the resulting composite part. In other embodiments of the invention, as later described herein, an internal mandrel placed within the SMP apparatus 12 may be configured to draw the SMP apparatus 12 (still in its malleable state) away from the composite part. In some embodiments of the invention, the SMP apparatus 12 may be urged away from the cured composite part while still in the malleable state, then allowed to cool and/or become at least somewhat rigid or fully rigid again before being removed from within the cured composite part.

The SMP apparatus 12 may be used to form a variety of composite parts of varying geometries, such as composite parts with trapped geometries. For example, the composite parts may be aircraft fuselages, wings, nacelles, panels, ducts, and aircraft structural supports or stiffeners. Examples of aircraft structural supports may include stringers, frames, trapezoidal hat-shaped stiffeners, bell-shaped stiffeners, inverted hat stiffeners, J-stiffeners, F-stiffeners, blade stiffeners, I-stiffeners, and C-stiffeners. Furthermore, the composite parts formed with the SMP apparatus 12 may include rotorcraft, pylons, thrust reversers, shrouds, inlets, winglets, wing tips, vertical and horizontal stabilizers, airframe structures, empennage, spars, ribs, tubular airframe structures, control surfaces, nose sections, fairings, flaps, ailerons, spoiler, slats, torque tubes, drive shafts, cowls, engine inlets, exhaust nozzles, exhaust cones, propellers, gearboxes, transmission housings, cuffs, rotor blades, fuel tanks, landing gear, landing gear wells, doors, subframes, longerons, wire trays, struts, brackets, frame stabilizers, gunmounts, control pedestals, instrument consoles, etc. These composite parts may be formed using the SMP apparatus 12 by first placing the composite material 14 against at least a portion of the SMP apparatus 12 when the SMP apparatus 12 is in its rigid tool configuration. Then the composite material 14 may be compressed against and/or by the SMP apparatus 12 in a rigid or malleable state during curing of the composite material 14 into the composite part. In some embodiments of the invention, more than one SMP apparatus 12 may be used to fabricate the composite part, as later described herein. In some embodiments of the invention where a plurality of SMP apparatuses are used to form the composite part, the SMP apparatuses may be configured to have different $T_g$ temperatures or different triggers for changing the modulus of the different SMP apparatuses, as described above.

Furthermore, internal stiffeners may be co-cured or co-bonded with any composite part, such as the composite parts listed above, using the SMP apparatus 12, as later described herein. The term co-curing is defined herein as simultaneously curing and bonding two uncured composite parts. The term co-bonding is defined herein as simultaneously curing one uncured composite part while bonding the uncured composite part to a hardened part or a previously-cured composite part. Internal stiffeners may include, for example, frames, stringers, or core, as defined above. The frames and stringers may be elongated structural stiffeners extending laterally and/or perpendicular relative to a length a composite part. In some embodiments of the invention, the frames may cross the stringers in a grid-like configuration. Examples of some specific types of frames and stringers may include trapezoidal hat-shaped stiffeners, bell-shaped stiffeners, inverted hat stiffeners, J-stiffeners, F-stiffeners, blade stiffeners, I-stiffeners, and C-stiffeners. Additionally, the SMP apparatus 12 may be used to form a variety of other composite parts, such as trailers, automotive ducts and manifolds, hoses, tires, turbochargers, tanks, automobiles, racing vehicles, boats, yachts, bicycles, canoes, kayaks, paddles, sporting goods, gun stocks, grips, crossbows and accessories, golf clubs and related components, fishing rods, guitars, pipes, poles, building supplies, wind turbine blades, engine components, furniture, sail masts, electronic enclosures, armor, driveshafts, satellites, missiles, and spacecraft. These composite parts may be formed using methods similar to any of the methods described herein.

Fabricating a Fuselage with the SMP Apparatus

Figure 12:
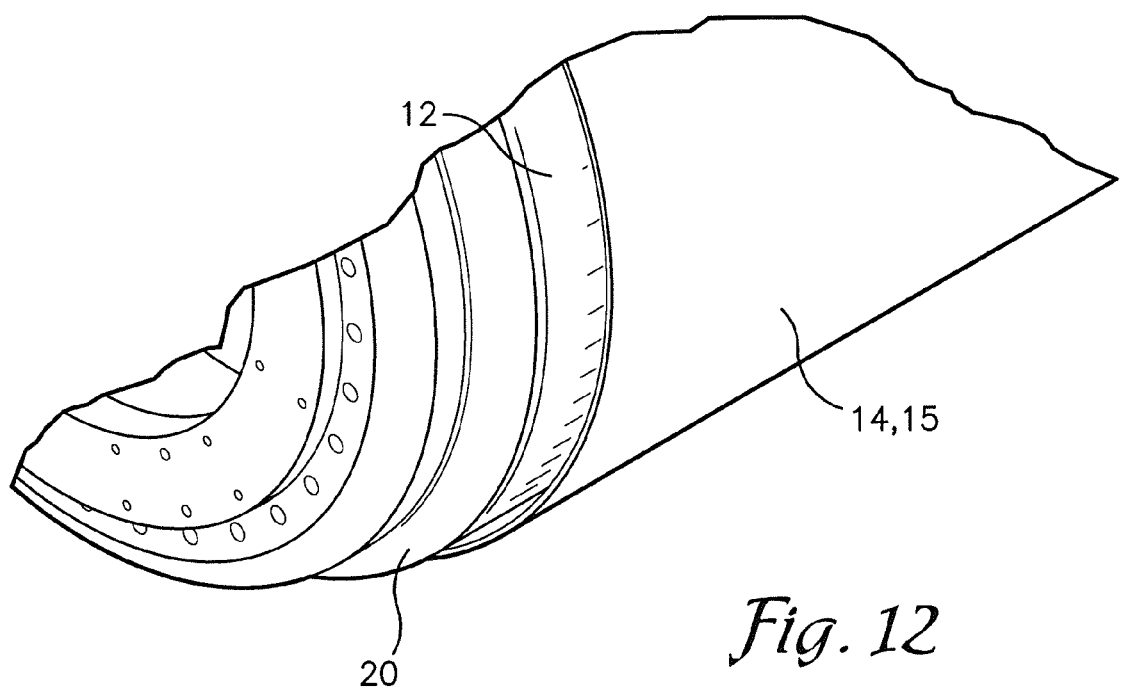
FIG. 12 is a fragmentary perspective view of the SMP apparatus and the composite material of FIG. 11 after the composite material is cured, illustrating space between the SMP apparatus and the cured composite material once the SMP apparatus is heated and contracted back toward the inner mandrel tool.
Figure 13:
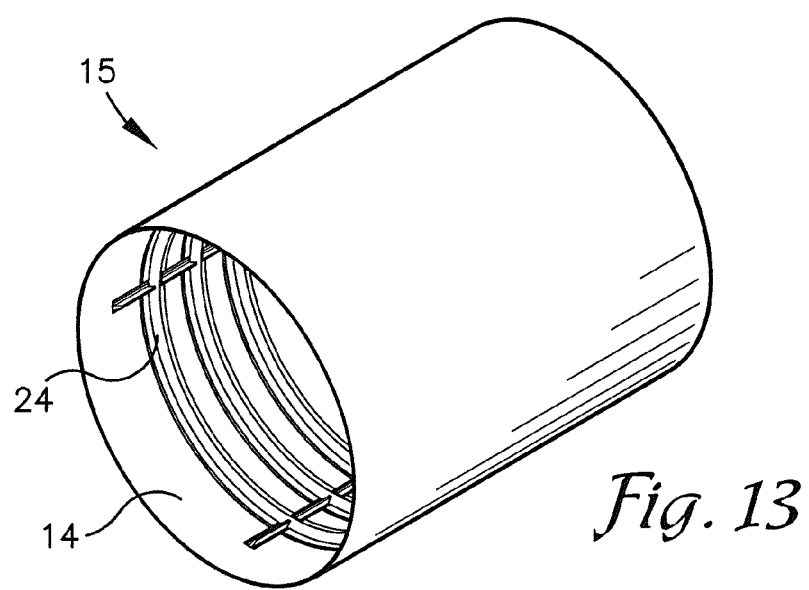
FIG. 13 is a perspective view of the composite material of FIG. 12 and the internal stiffeners of FIG. 6 co-cured or co-bonded together into a rigid fuselage, with the inner mandrel tool, the rigid external tool, and the SMP apparatus removed therefrom.

Another embodiment of the present invention is a method of fabricating an aircraft fuselage 15 with integrated internal stiffeners 24, as illustrated in FIG. 13. The method of this embodiment may be implemented with the SMP apparatus 12, as described above, along with an inner mandrel tool 16, end seals 18,20, the dummy skin 22, the internal stiffeners 24, the reinforcement inserts 26, and the rigid external tool 28, as best illustrated in FIGS. 2-12.

Figure 3:
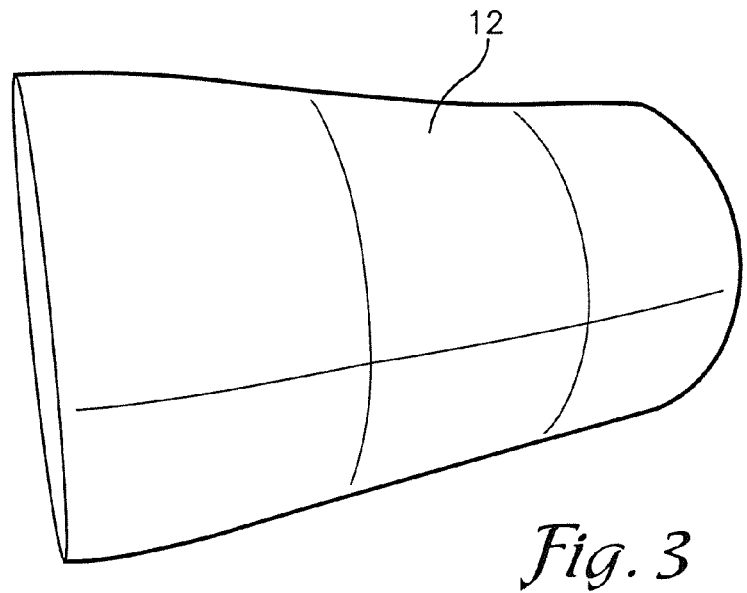
FIG. 3 is a perspective view of another embodiment of an SMP apparatus in a rigid, inflated state.

In this embodiment of the invention, the SMP apparatus 12, as illustrated in FIG. 3, may have the traits and characteristics described above in reference to the embodiment of the invention illustrated in FIGS. 1-2. Furthermore, the SMP apparatus 12 may have a barrel, bottle, funnel, cone, or cylinder shape as its cast memory shape. However, any other cast memory shape may be used without departing from the scope of the invention. In some embodiments of the invention, the SMP apparatus 12 may be received in an inflated state. Specifically, the SMP apparatus 12 may have been previously heated and inflated to a larger diameter than that of its memory shape and then cooled and hardened in that inflated state. The SMP apparatus 12 may comprise one or two open ends. In some embodiments of the invention, the SMP apparatus 12 may be approximately 1 inch to 35 ft in diameter and approximately 1 ft to 75 ft in length. However, the SMP apparatus 12 may have any dimensions without departing from the scope of the invention.

Figure 4:
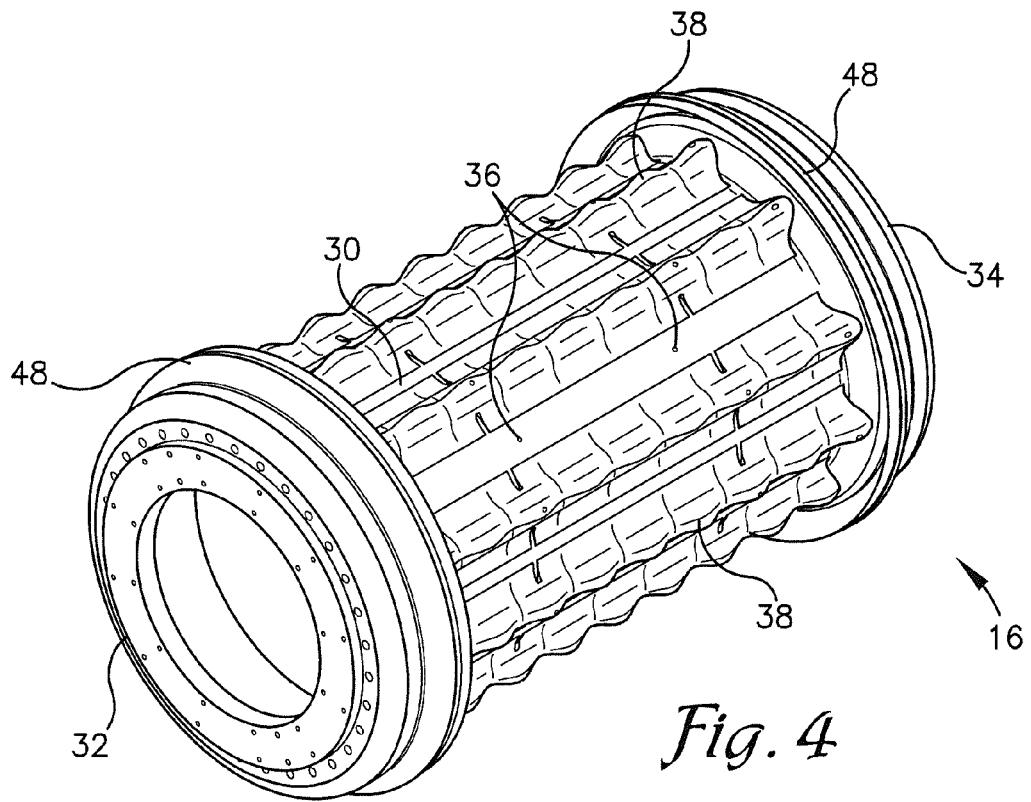
FIG. 4 is a perspective view of an inner mandrel tool constructed in accordance with an embodiment of the present invention.

The inner mandrel tool 16, as illustrated in FIG. 4, may be made of any rigid, durable material which remains rigid throughout a composite cure cycle. In some embodiments of the invention, the inner mandrel tool 16 may be substantially cylindrical. Furthermore, the inner mandrel tool 16 may be hollow, having a cylindrical wall 30 and two opposing ends 32,34 that may comprise openings (not shown) to the hollow space within the inner mandrel tool 16.

In some embodiments of the invention, one or more inflation openings 36 may be provided through the cylindrical wall 30 such that a compressed gas may be forced within the hollow inner mandrel tool 16, such as by way of airlines (not shown), thereby providing inflation force outward from the inner mandrel tool 16. The inflation openings 36 may also be configured for suctioning the SMP apparatus 12 against the inner mandrel tool 16 during various steps of fabricating the fuselage 15, as described below.

In some embodiments of the invention, an outer surface of the inner mandrel tool 16 may also comprise varying contours. For example, the varying contours may include a number of protrusions 38 and/or indentions for use in recovery of the SMP apparatus 12 after cure of the composite part. Specifically, as illustrated in FIG. 4, an outer surface of the cylindrical wall 30 may comprise the protrusions 38 in the form of a plurality of ridges or ribs circumferentially or axially spaced and arranged substantially parallel with each other. Each of the ridges or ribs may extend between the opposing ends 32,34 of the inner mandrel tool 16 and may be shaped with a wavy or sinusoidal pattern extending between the opposing ends 32,34 of the inner mandrel tool 16, as illustrated in FIG. 4. Additionally or alternatively, the protrusions 38 may be one or more concentric rings formed around the inner mandrel tool 16, or may have any other configuration. The protrusions 38 may be integrally formed or otherwise attached to the inner mandrel tool 16.

The purpose of the varying contours or protrusions 38 may be to introduce a greater amount of strain to the SMP apparatus 12 in a smaller cross-sectional area. Specifically, when the SMP apparatus 12 is urged by an induced pressure differential toward the inner mandrel tool 16 to be removed from within a cured composite part, the varying contours or protrusions 38 prevent the SMP apparatus 12 from folding over onto its self. For example, after its outward expansion during cure, as later described herein, the SMP apparatus 12 may be stretched out. The axial and/or hoop strain induced by the varying contours or protrusions 38 may prevent the SMP apparatus 12 from folding over on itself or creasing and damaging the SMP material.

So essentially the varying contours, protrusions 38, and/or indentions provide a larger surface area for the SMP apparatus 12 to contract against without requiring an increase in size and/or cross-section of the inner mandrel tool 16. In the embodiment illustrated in FIG. 4, if the radius of the inner mandrel tool 16 is "r", and the length is "L", then the equation for the surface area would normally be $2\pi*r*L$. However, due to the protrusions 38 extending from the surface of the inner mandrel tool 16 in FIG. 4, the surface area of the inner mandrel tool 16 in FIG. 4 is greater than $2\pi*r*L$.

Figure 5:
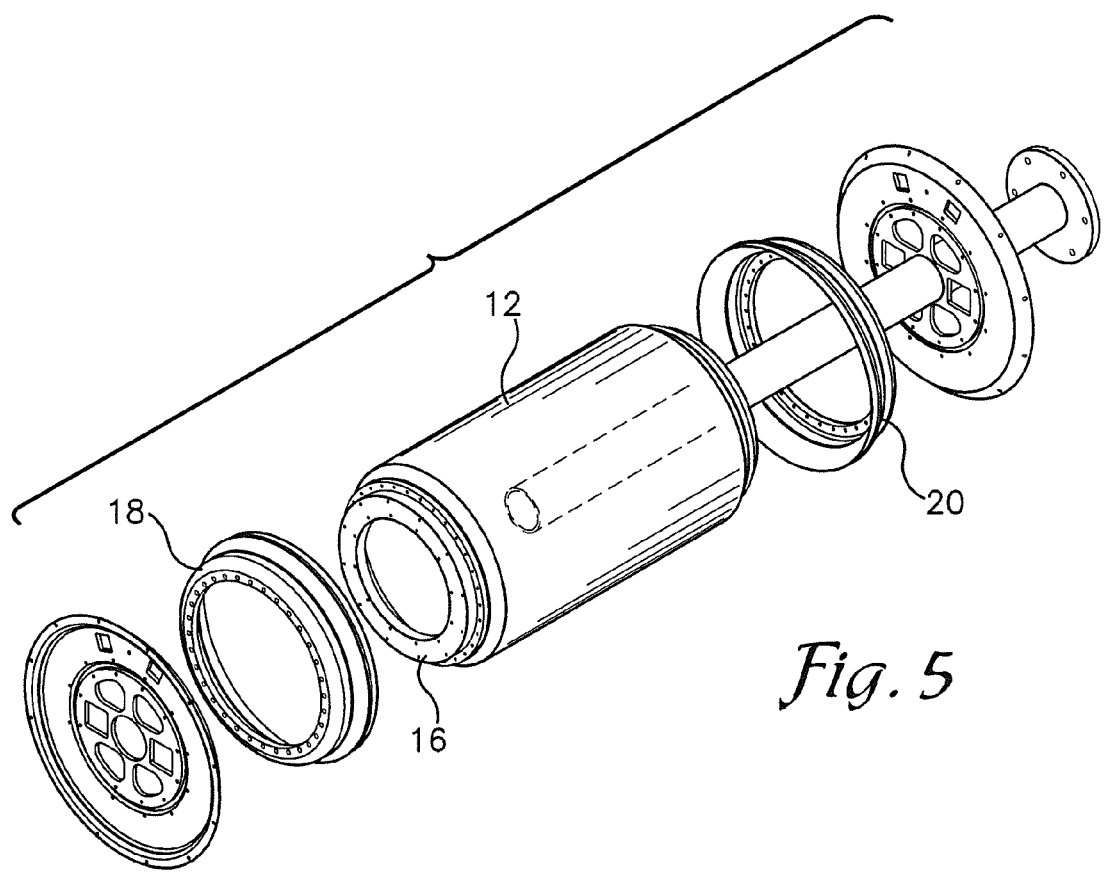
FIG. 5 is an exploded perspective view of the SMP apparatus of FIG. 3 after it is slid over the inner mandrel tool illustrated in FIG. 4 and is heated to contract against the inner mandrel tool, and also illustrates end seals configured to seal the SMP apparatus to the inner mandrel tool at each end thereof.

As illustrated in FIG. 5, the end seals 18,20 may be any end fittings, seals, and/or sealant configured for providing an airtight seal between the SMP apparatus 12 and the inner mandrel tool 16 at or proximate to the ends 32,34 of the SMP apparatus 12. For example, the end seals 18,20 may be swage locks shaped and configured to attach to the ends 32,34 of the inner mandrel tool 16 over portions of the SMP apparatus 12 proximate to the open ends of the SMP apparatus 12, thereby forming a pressure vessel within the SMP apparatus 12. Due to the nature of the SMP material, heat may be required to form an adequate seal between the end seals 18,20, the SMP apparatus 12, and/or the inner mandrel tool 16. In some embodiments of the invention, the end seals 18,20 may be substantially circular swage locks. Inflation pressure may be introduced by pumping compressed gas into the SMP apparatus 12 by way of one or more airlines (not shown) fed through the end seals 18,20 in some embodiments of the invention. However, pressure applied to the SMP apparatus 12 may be provided through any openings in the end seals 18,20, the inner mandrel tool 16, and/or the rigid external tool 28 without departing from the scope of the invention. Note that in some embodiments of the invention, the end seals 18,20 may be omitted or may rather be configured to additionally or alternatively seal the SMP apparatus 12 to the rigid external tool 28.

Figure 6A:
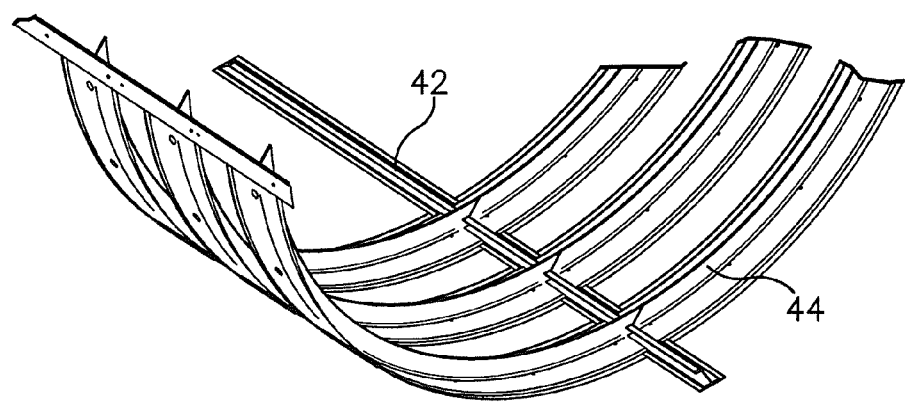
FIG. 6a is a perspective view of internal stiffeners constructed according to embodiments of the present invention and configured to be co-bonded or co-cured to a composite part.
Figure 6B:
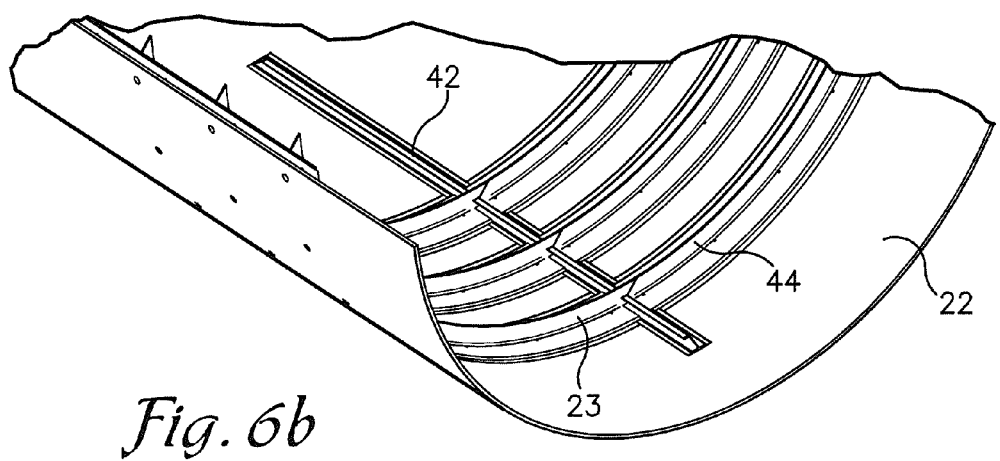
FIG. 6b is a fragmentary perspective view of a dummy skin and dummy stiffeners constructed in accordance with an embodiment of the present invention to assist in forming the SMP apparatus of FIG. 5 into a desired rigid tool configuration.
Figure 7:
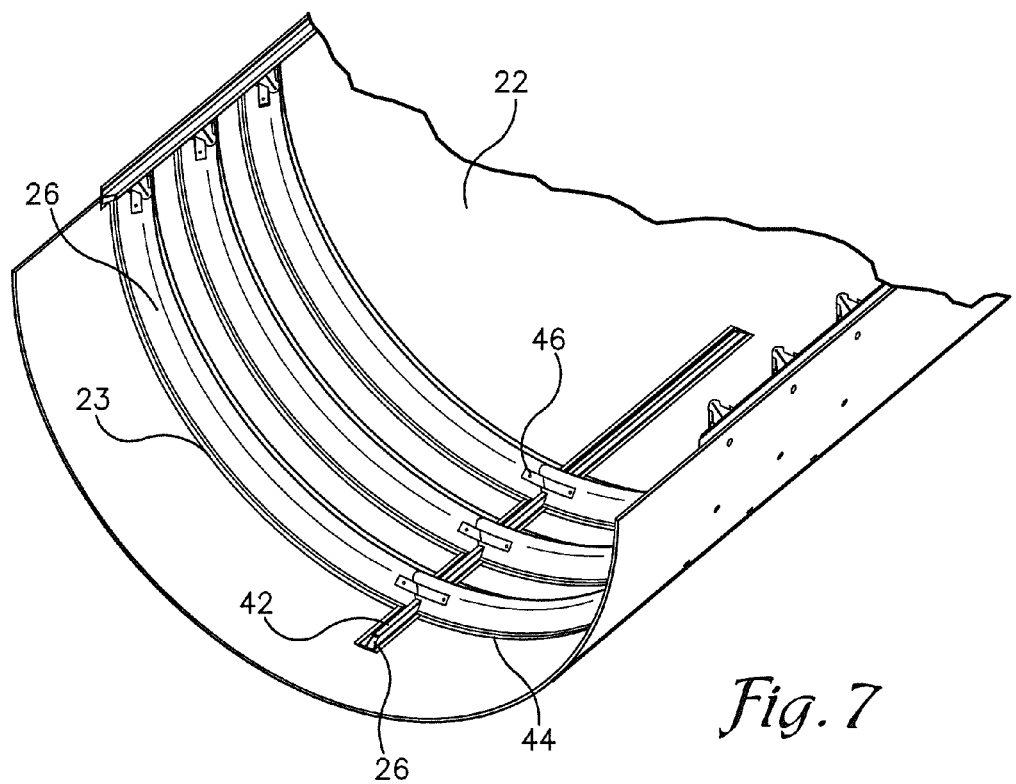
FIG. 7 is a fragmentary perspective view of the dummy skin and dummy stiffeners of FIG. 6, further illustrating reinforcement inserts placed over and onto the dummy stiffeners.

The dummy skin 22, as illustrated in FIGS. 6b and 7, may be made from any material and may have a thickness corresponding to a thickness of the uncured composite material 14 to be placed onto the SMP apparatus 12. The dummy skin 22 may be made of composite material forms, metal, unreinforced plastics, or any material exhibiting good dimensional stability under heat and pressure. For example, the dummy skin 22 may be formed of composite material, such as graphite fiber reinforced epoxy composite laminate. The dummy skin 22 is configured to be placed within the rigid external tool 28, as later described herein, during deformation of the SMP apparatus 12 into the rigid tool configuration. In some embodiments of the invention, the dummy skin 22 may also include or be integrally formed with the dummy internal stiffeners 23.

The dummy internal stiffeners 23, as illustrated in FIGS. 6b and 7 may be rigid structures sized and shaped substantially identical to the internal stiffeners 24 and arranged on the dummy skin 22 to represent the cured or uncured internal stiffeners 24 during deformation of the SMP apparatus into the rigid tool configuration. The dummy internal stiffeners 23 may alternatively, be sized and shaped to represent both the internal stiffeners and the reinforcement inserts 26 during deformation of the SMP apparatus 12 into the rigid tool configuration.

Figure 10A:
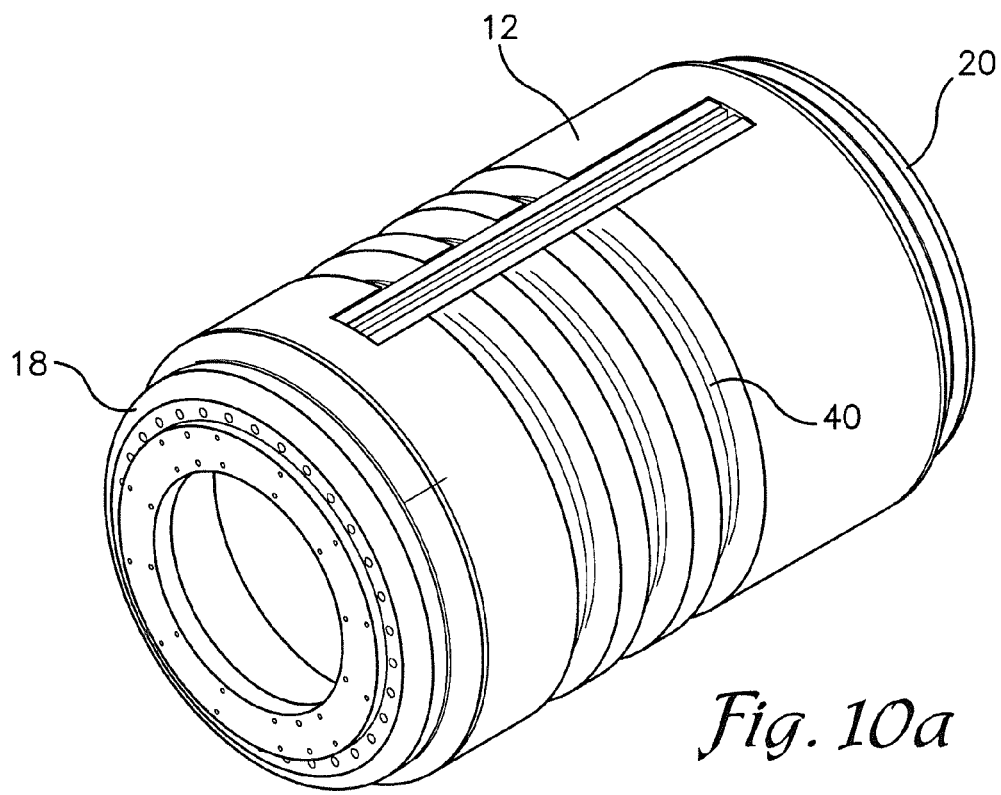
FIG. 10a is a perspective view of the SMP apparatus of FIG. 9 in the desired rigid tool configuration with the internal stiffeners removed from the cavities formed therein.
Figure 10B:
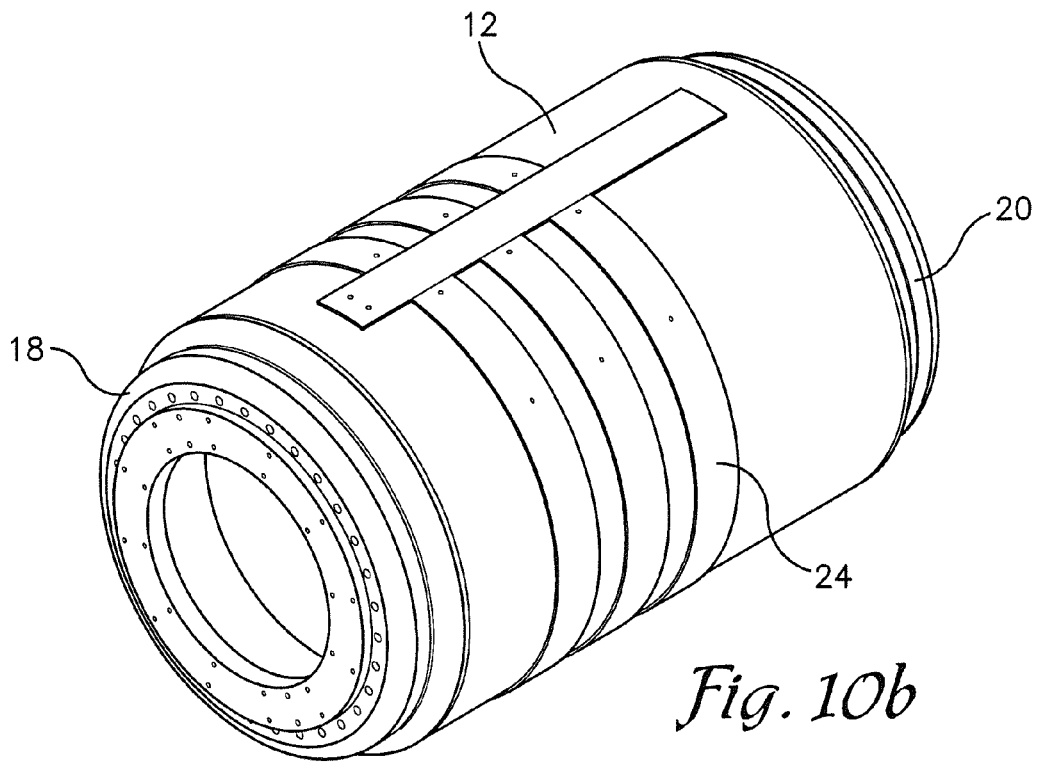
FIG. 10b is a perspective view of the SMP apparatus of FIG. 5 in the desired rigid tool configuration with the internal stiffeners of FIG. 6a resting in the cavities formed therein.

The internal stiffeners 24, as illustrated in FIGS. 6a and 10b, may be any sub-structure stiffeners configured to be co-bonded and/or co-cured to the composite material 14 of the fuselage or other composite part. The internal stiffeners 24 may be elongated structural components curved to match a contour of an internal surface of the fuselage. The internal stiffeners 24 may comprise cured composite material or uncured composite material in the form of internal frame pieces, such as frames and stringers. The internal stiffeners 24 may be held in a desired shaped during cure via the reinforcement inserts 26, as later described herein. Some examples of internal stiffeners 24 include, but are not limited to trapezoidal hat-shaped stiffeners, bell-shaped stiffeners, inverted hat stiffeners, J-stiffeners, F-stiffeners, blade stiffeners, I-stiffeners, C-stiffeners, core stiffeners, sandwich panel core, honeycomb core, and the like. In some embodiments of the invention, the internal stiffeners 24 may include approximately 8-inch tall frames & approximately 3-inch tall stringers. However, any dimensions may be used without departing from the scope of this invention.

In some embodiments of the invention, the frames may be configured to intersect with the stringers in a grid-like configuration within the finished fuselage 15. For example, the stringers may be formed to overlap the frames and/or the frames may be formed to overlap the stringers, as illustrated in FIG. 6a. The overlapping of the internal stiffeners 24 may be accomplished by sizing and shaping the internal stiffeners 24 to fit together like puzzle pieces. The same configurations may also be used for the dummy internal stiffeners 23, as illustrated in FIGS. 6b, 7, 8, and 9.

The reinforcement inserts 26, as illustrated in FIG. 7, may be made of a rigid material, such as a nickel steel alloy like INVAR, and may contact and/or mate with portions of the internal stiffeners 24 and/or the dummy internal stiffeners 23 facing the SMP apparatus 12. The reinforcement inserts 26 may be configured to alleviate sharp corners and bends of the internal stiffeners 24 and/or the dummy internal stiffeners 23 to better facilitate forming the SMP apparatus 12. Specifically, the reinforcement inserts 26 may be configured to mate with or rest within one or more angles presented by one or more of the internal stiffeners 24 and/or dummy internal stiffeners 23. For example, if one of the internal stiffeners 24 or dummy internal stiffeners 23 presents a right angle, one of the reinforcement inserts 26 may have two surfaces meeting at a right angle and configured to mate with the right angle of that internal stiffener 24 or dummy internal stiffener 23. The reinforcement inserts 26 may also have surfaces facing away from the internal stiffener 24 or dummy internal stiffener 23 that are substantially flat and/or present more gradual angles. For example, one or more of the reinforcement inserts 24 may have at least one chamfered or angled surface and/or rounded edges which may contact the SMP apparatus 12 as it is urged outward toward the rigid external tool 28, as later described herein. The reinforcement inserts 26 may also be curved, length-wise, to substantially match a curve of the internal stiffeners 24, the dummy internal stiffeners 23, and/or the inner surface of the rigid external tool 28.

The internal stiffeners 24 and/or the dummy internal stiffeners 23, along with the reinforcement inserts 26 may be configured to form cavities 40, such as grooves or channels, into the SMP apparatus 12, as illustrated in FIG. 10*a* and later described herein. In some embodiments of the invention, the dummy internal stiffeners 23 and/or the reinforcement inserts 26 may be configured to form the cavities 40 into the SMP apparatus 12, and may later be replaced with the internal stiffeners 24. For example, once the SMP apparatus 12 is in the rigid tool configuration, the dummy skin 22, dummy internal stiffeners 23, and/or reinforcement inserts 26 may be removed from the cavities 40 and replaced with the uncured internal stiffeners 24, configured against the reinforcement inserts 26, to be co-cured within the fuselage 15. Alternatively, once the SMP apparatus 12 is in the rigid tool configuration, the dummy skin 22, dummy internal stiffeners 23, and/or reinforcement inserts 26 may be removed from the cavities 40 and replaced with pre-cured internal stiffeners 24, configured against the reinforcement inserts 26 to be co-bonded with the fuselage 15.

In one example embodiment of the invention, as illustrated in FIGS. 6*a*, 6*b*, and 7, the internal stiffeners 24 and/or the dummy internal stiffeners 23 may comprise J-stiffeners 42 supported on at least two sides by corresponding reinforcement inserts 26. Furthermore, the internal stiffeners 24 and/or the dummy internal stiffeners 23 in this example embodiment may comprise frames 44 having a substantially "T"-shaped cross-section, with the frames 44 also each supported on at least two sides by corresponding reinforcement inserts 26. As illustrated in FIG. 7, the reinforcement inserts 26 and/or portions of the dummy internal stiffeners 23 may be held in place and held together by mechanical fasteners 46, such as splice straps and bolts. However, the internal stiffeners 24 and/or the dummy internal stiffeners 23 may have any known configurations and the reinforcement inserts 26 may be of any shape and configuration to mate therewith.

Figure 8:
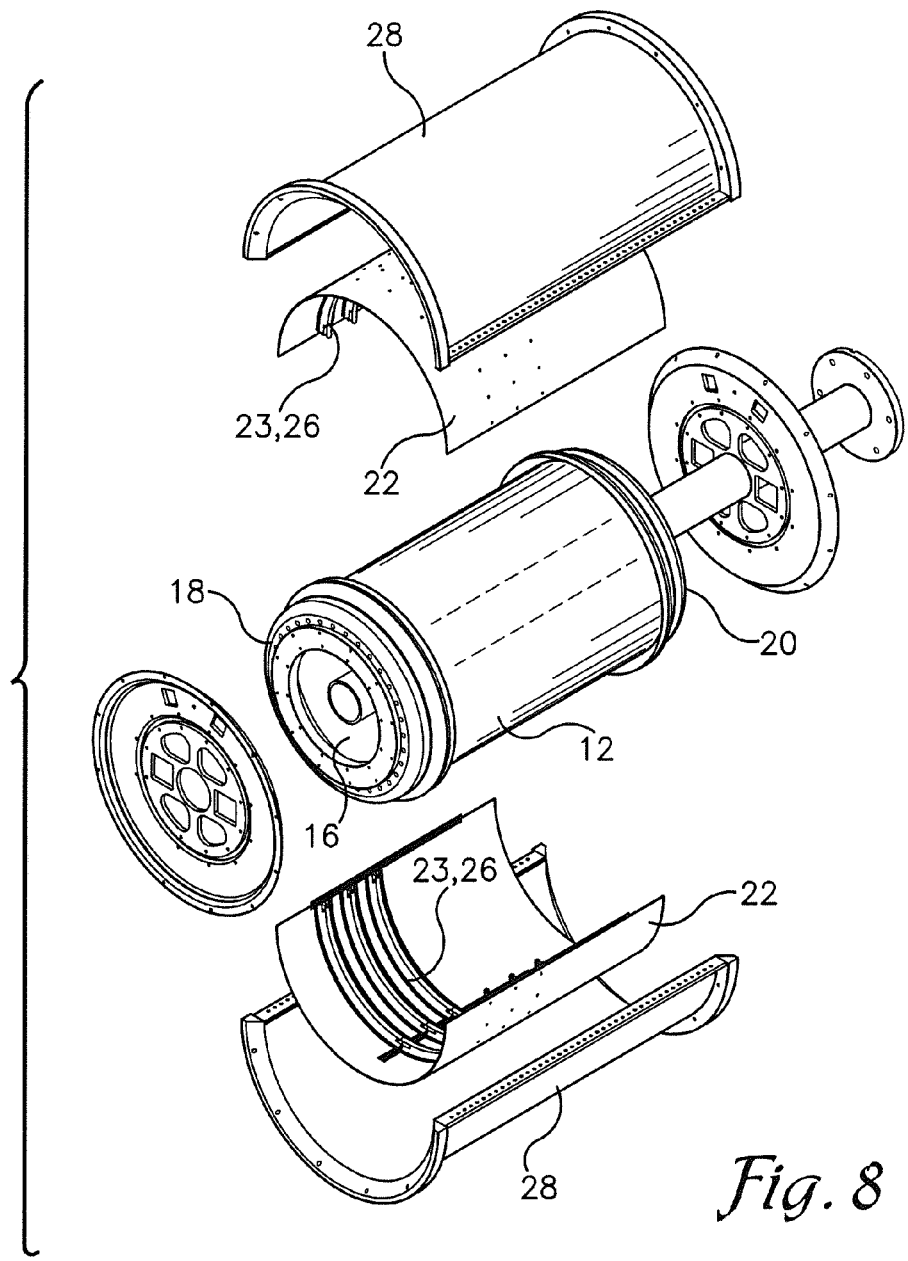
FIG. 8 is an exploded perspective view of the inner mandrel tool of FIG. 5 placed into a rigid external tool constructed in accordance with an embodiment of the present invention.

The rigid external tool 28, as illustrated in FIG. 8, may be a rigid tool having an inner surface configured to form a shape of an outer surface of the fuselage 15. For example, the rigid external tool 28 may be a clamshell tool, as illustrated in FIG. 2 or as illustrated in FIG. 8, and may have two halves, including a lower clamshell and an upper clamshell. Together, the two halves may form a hollow cylindrical shape bounded by the inner surface of the rigid external tool 28. However, the rigid external tool 28 may comprise any plurality of portions which, when joined together, may form an inner surface configured for forming the shape of the outer surface of the fuselage 15.

In general, a method of fabricating the fuselage 15 may include the steps of forming the SMP apparatus 12 into the rigid tool configuration with the cavities 40 for the internal stiffeners 24, placing the cured or uncured internal stiffeners 24 and reinforcement inserts 26 into the cavities 40 in the SMP apparatus 12, placing the uncured composite material 14 onto the SMP apparatus 12, then placing that SMP apparatus 12 and the uncured composite material 14 into the rigid external tool 28. The method may next include the steps of curing the composite material 14 via pressure and heat while simultaneously inflating or otherwise expanding the SMP apparatus 12 to compress the composite material 14 against the rigid external tool 28 during the curing process, then, once the composite material 14 is cured, urging the SMP apparatus 12 to a reduced cross-section, and extracting the SMP apparatus 12 out from within the resulting fuselage. The internal stiffeners 24 are thereby co-bonded and/or co-cured with the composite fuselage, eliminating the need for mechanical fasteners to attach the internal stiffeners 24 to the fuselage. The methods described herein for co-curing or co-bonding internal stiffeners 24 to the fuselage may also be used to co-cure or co-bond stiffeners or other components to any composite part known in the art, such as any of the various aircraft components listed herein.

Figure 14:
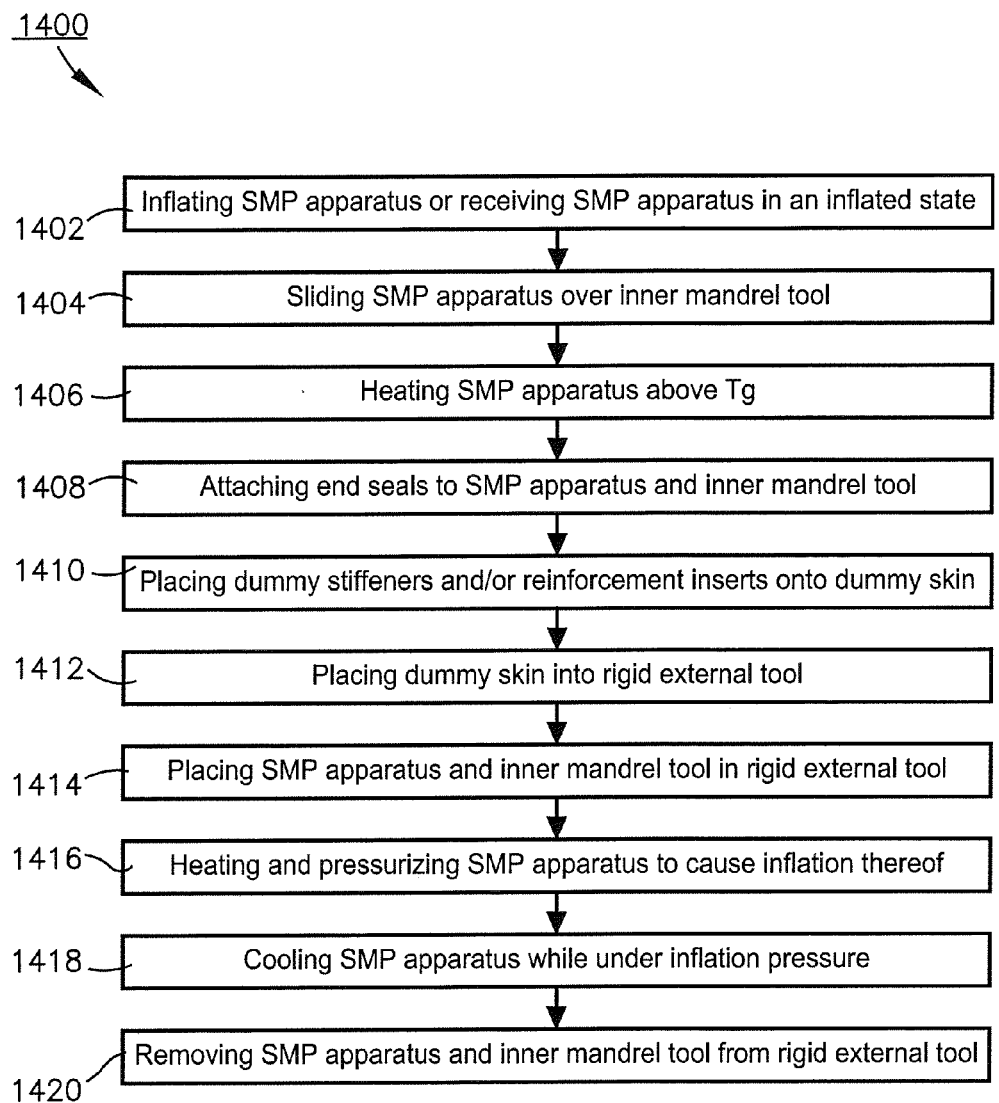
FIG. 14 is a flow chart of a method for forming the SMP apparatus into a desired rigid tool configuration in accordance with an embodiment of the present invention.

The flow chart of FIG. 14 depicts the steps of an exemplary method 1400 for forming the SMP apparatus 12 into the rigid tool configuration used to fabricate the fuselage 15. In some alternative implementations, the functions noted in the various blocks may occur out of the order depicted in FIG. 14. For example, two blocks shown in succession in FIG. 14 may in fact be executed substantially concurrently, or the blocks may sometimes be executed in the reverse order depending upon the functionality involved.

The method 1400 may comprise the steps of receiving the SMP apparatus 12 in the inflated stated, as illustrated in FIG. 3, or receiving the SMP apparatus 12 in its memory shape and then heating and inflating the SMP apparatus 12 into its inflated state, as depicted in block 1402. This expansion of the SMP apparatus 12 may also be accomplished using various other triggers to change the modulus of the SMP apparatus 12 and/or various other forces or techniques to expand the SMP apparatus 12 to the desired size. The SMP apparatus 12 may then be large enough to be slid over the inner mandrel tool 16. Alternatively, the SMP apparatus 12 may be cast with a memory shape large enough to fit over the inner mandrel tool 16. The next step of method 1400 may be sliding the inner mandrel tool 16 into the SMP apparatus 12 or sliding the SMP apparatus 12 onto the inner mandrel tool 16, as depicted in block 1404. In yet another alternative embodiment of the invention, the SMP apparatus 12 may be received in a collapsed state and may already be conformed to the inner mandrel tool 16 of FIG. 4.

Once the SMP apparatus 12 is positioned on the inner mandrel tool 16, the method 1400 may comprise heating the SMP apparatus 12 above $T_g$ at which the SMP material becomes malleable and formable, as depicted in block 1406. Above the $T_g$ threshold temperature, the SMP apparatus 12 may naturally contract back toward its original memory shape and size, causing the SMP apparatus 12 to contract around and form to the inner mandrel tool 16, as illustrated in FIG. 5. Additionally or alternatively, vacuum may be applied from within the inner mandrel tool 16, via the inflation openings, and may suction the heated, malleable SMP apparatus 12 against the inner mandrel tool 16. In some embodiments of the invention, the inner mandrel tool 16 may have chamfered or angled portions 48 at each of the opposing ends 32,34 to which the SMP apparatus 12 may be conformed. Any excess material extending outward beyond the chamfered or angled portions 48 may need to be darted or cut off.

The method 1400 may further comprise the step of applying the end seals 18,20 to the SMP apparatus 12 and the inner mandrel tool 16, as depicted in block 1408, creating a pressure vessel between the inner mandrel tool 16 and the SMP apparatus 12. Specifically, as the SMP apparatus 12 contracts, end portions of the SMP apparatus 12 may be pressed inward toward the inner mandrel tool 16 and/or its chamfered or angled portions 48 and locked thereto by the end seals 18,20, such as swage locks. In some embodiments of the invention, the end seals 18,20 may mate with the chamfered or angled portions 48 of the inner mandrel tool 16, sandwiching portions of the SMP apparatus 12 between the end seals 18,20 and the inner mandrel tool 16 to form an airtight seal. In some alternative embodiments of the invention, the step of applying the end seals 18,20 may be omitted or the SMP apparatus 12 may be sealed in other ways or to other surfaces to allow a pressure differential to act on the SMP apparatus 12.

The next step of method 1400 may comprise placing the dummy internal stiffeners 23 and/or reinforcement inserts 26 onto the dummy skin 22 in a configuration corresponding with desired locations of the internal stiffeners 24 within the fuselage, as depicted in block 1410 and illustrated in FIG. 7. The dummy skin 22, dummy internal stiffeners 23, and/or the reinforcement inserts 26 may be covered with a thin film or some other substance to prevent them from sticking to each other and/or to the SMP apparatus 12. The method 1400 may then comprise placing the dummy skin 22 into the rigid external tool 28, as depicted in block 1412. Specifically, the dummy skin 22 may be applied to the inner surface of the rigid external tool 28 in order to mimic or serve as a place holder for the thickness of the composite material 14 which will later be placed onto the SMP apparatus 12. This ensures that the SMP apparatus 12 with the composite material 14 applied thereon at a desired thickness will still fit within the rigid external tool 28.

The reinforcement inserts 26 may be positioned onto the dummy skin 22 resting on the rigid external tool 28 along with the dummy internal stiffeners 23, which may be shaped and configured to emulate the size and configuration of the cured or uncured internal stiffeners 24. The dummy internal stiffeners 23 may later be removed from the cavities 40 and replaced with the cured or uncured internal stiffeners 24. The cured or uncured internal stiffeners 24 along with the reinforcement inserts 26 may then be placed into the grooves or cavities 40 to co-bond or co-cure the internal stiffeners 24 with the composite material 14 fabricating the fuselage 15.

As noted above, the dummy internal stiffeners 23 may be omitted and/or replaced with the internal stiffeners 24 in any of the steps described herein in an uncured or cured state. For example, the internal stiffeners 24 and/or the reinforcement inserts may be used to form the cavities 40. In one embodiment of the invention, the internal stiffeners 24 may be pre-cured and/or cured during shaping of the SMP apparatus 12 and may later be co-bonded to the composite material 14 during its cure, thus fabricating the fuselage 15.

The method 1400 may further comprise the steps of placing the SMP apparatus 12, along with the inner mandrel tool 16, inside the rigid external tool 28, as depicted in block 1414 and illustrated in FIG. 8, and then heating and pressurizing the SMP apparatus 12, as depicted in block 1416. The heat and pressure may force the SMP apparatus 12 to inflate and press against the dummy skin 22, dummy internal stiffeners 23, internal stiffeners 24, and/or reinforcement inserts 26. As mentioned above, the SMP apparatus 12 may be heated to or above $T_g$ in order to change the modulus of the SMP apparatus 12 to make it formable and expandable. However, other methods may also be used to change the modulus of the SMP apparatus 12, as described herein. Furthermore, in alternative embodiments of the invention, method steps 1410-1414 may be replaced with a step of placing the SMP apparatus 12 inside any rigid outer mold shaped and configured to mimic an inner surface of the composite part being formed and comprising protrusions for forming the desired cavities 40 into the SMP apparatus 12.

The pressure or pressure differential may be induced in a number of ways, such as via a forced compressed gas applied through the inflation openings 36 of the inner mandrel tool 16, as illustrated in FIG. 4. For example, the pressure required to expand the SMP apparatus 12 may depend on the thickness and/or overall size of the SMP apparatus 12. Furthermore, the type of SMP material used and/or the design of the SMP apparatus 12 may also affect how easy or how difficult it is to strain the SMP apparatus 12. In some embodiments of the invention, pressure in a range of 1-150 pound-force per square inch gauge (psig) or pressure in a narrower range of 30-90 psig may be applied to inflate the SMP apparatus 12. For example, approximately 45 psig may be applied within the SMP apparatus 12 to inflate the SMP apparatus 12. Furthermore, in any of the method steps described herein where the SMP apparatus 12 is heated and pressurized, a low pressure differential may be induced as heat is ramped up to or above $T_g$ to prevent the SMP apparatus 12 from collapsing away from the composite material 14 as it starts to soften. Then, at some point after the SMP apparatus 12 exceeds $T_g$, the pressure differential may be stepped up to the full desired amount. For example, a low pressure of approximately 5 to 10 psi may be applied within the SMP apparatus 12 until enough heat has been applied to make the SMP apparatus 12 sufficiently malleable, at which point the pressure applied therein may be stepped up to the cure cycle pressure, such as 30-90 psi.

Figure 9:
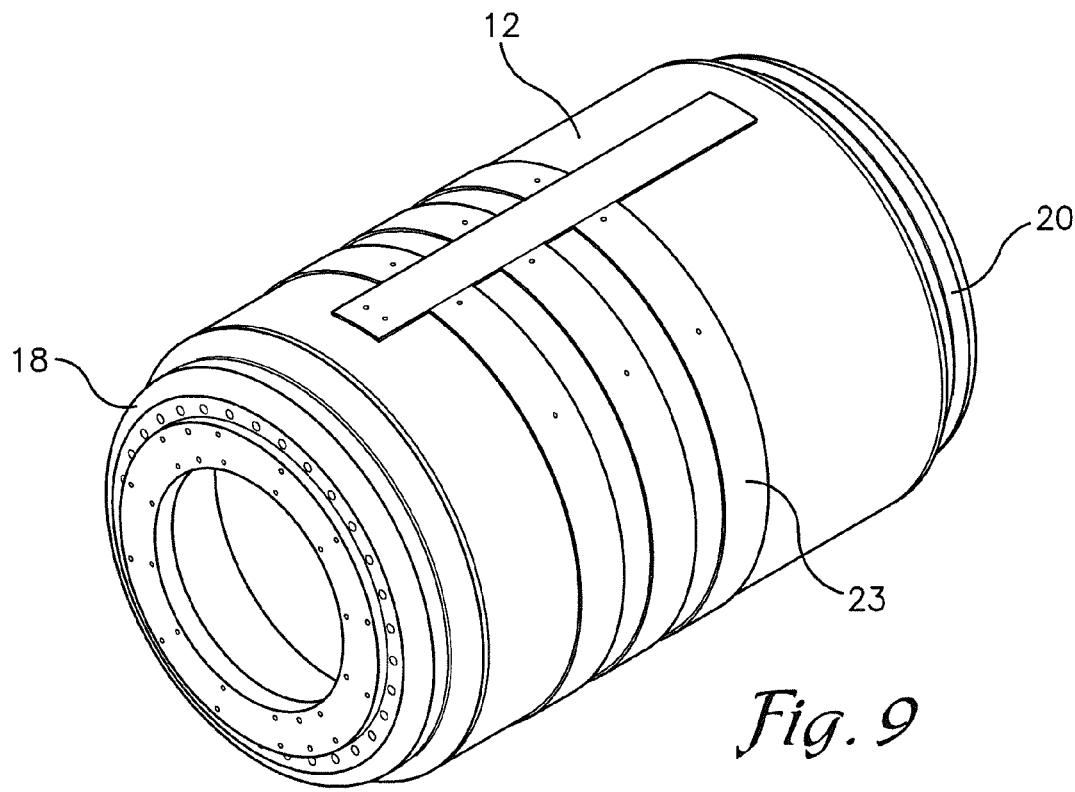
FIG. 9 is a perspective view of the SMP apparatus of FIG. 5 in the desired rigid tool configuration with the dummy internal stiffeners resting in cavities formed therein.

Next, the method 1400 may comprise cooling the SMP apparatus 12 to harden it in the rigid tool configuration, as depicted in block 1418. The inflation pressure may continue to be applied as the temperature of the SMP apparatus 12 is cooled to a point below $T_g$ such that the SMP apparatus is hardened in its inflated rigid tool configuration. The SMP apparatus 12 is thereby shaped according to the dummy skin 22, dummy internal stiffeners 23, internal stiffeners 24, and/or reinforcement inserts 26, which form the cavities 40, cavities, or grooves into the SMP apparatus 12. As depicted in block 1420, the method 1400 may then comprise removing the SMP apparatus 12 and inner mandrel tool 16 from the rigid external tool 28. The dummy skin 22 may also be removed from the SMP apparatus 12, as illustrated in FIG. 9. FIG. 10*a* further illustrates the resulting SMP apparatus 12 in the rigid tool configuration after the dummy internal stiffeners 23 are removed, thereby revealing the cavities 40 formed by method 1400. FIG. 10*b* illustrates the resulting SMP apparatus 12 in the rigid tool configuration with the internal stiffeners 24 placed where the dummy internal stiffeners 23 were located in FIG. 9.

Figure 15:
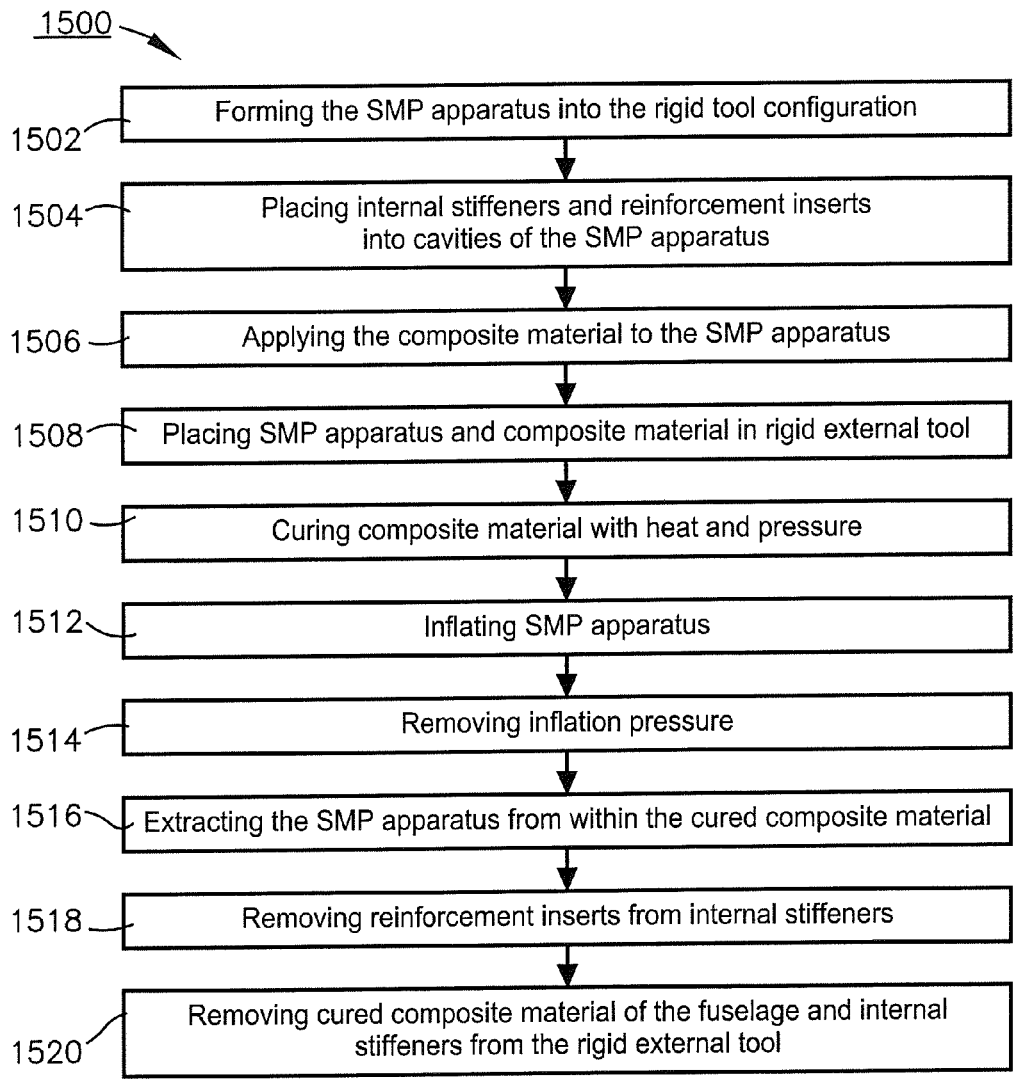
FIG. 15 is a flow chart of a method for fabricating a fuselage using the SMP apparatus in accordance with an embodiment of the present invention.

The flow chart of FIG. 15 depicts the steps of an exemplary method 1500 for fabricating the fuselage 15 using the SMP apparatus 12 in more detail. In some alternative implementations, the functions noted in the various blocks may occur out of the order depicted in FIG. 15. For example, two blocks shown in succession in FIG. 15 may in fact be executed substantially concurrently, or the blocks may sometimes be executed in the reverse order depending upon the functionality involved.

As illustrated in FIG. 15, the method 1500 may first include the step of forming the SMP apparatus 12 into the rigid tool configuration, as depicted in block 1502 and in the method steps of FIG. 14. As noted above, this step may require forming the cavities 40 in the SMP apparatus 12 in a configuration corresponding with desired locations of the internal stiffeners 24 within the finished fuselage 15. A variety of methods may be used to shape the SMP apparatus 12 into the desired rigid tool configuration with the cavities 40, cavities, or grooves formed therein.

Once the SMP apparatus 12 is formed into the rigid tool configuration, the method 1500 of fabricating the fuselage 15 may include the step of placing the cured or uncured internal stiffeners 24 and reinforcement inserts 26 into the cavities in the SMP apparatus 12, as depicted in block 1504 and illustrated in FIG. 10*b*. However, in some embodiments of the invention, if the internal stiffeners 24 were already positioned on or between the reinforcement inserts 26 during the heating and forming of the SMP apparatus 12 into the rigid tool configuration, then the internal stiffeners 24 and reinforcement inserts 26 may remain within the resulting cavities 40, cavities, or grooves which they created in the SMP apparatus 12, and step 1504 may be omitted.

In some embodiments of the invention, the internal stiffeners 24 may be uncured material applied to and/or wrapped around one or more stiffener SMP apparatuses, made of SMP material as described above for the SMP apparatus 12. In this way, both the internal stiffeners 24 and the composite part or fuselage 15 may be co-cured using SMP material. However, the SMP material used for the stiffener SMP apparatuses may have a different trigger and/or a different $T_g$ than the SMP apparatus 12 used to form the fuselage 15. That way either the stiffener SMP apparatuses or the SMP apparatus 12 for the fuselage 15 may remain rigid during co-cure while the other of the stiffener SMP apparatuses and the SMP apparatus 12 is used as an internal bladder during co-cure.

Figure 11:
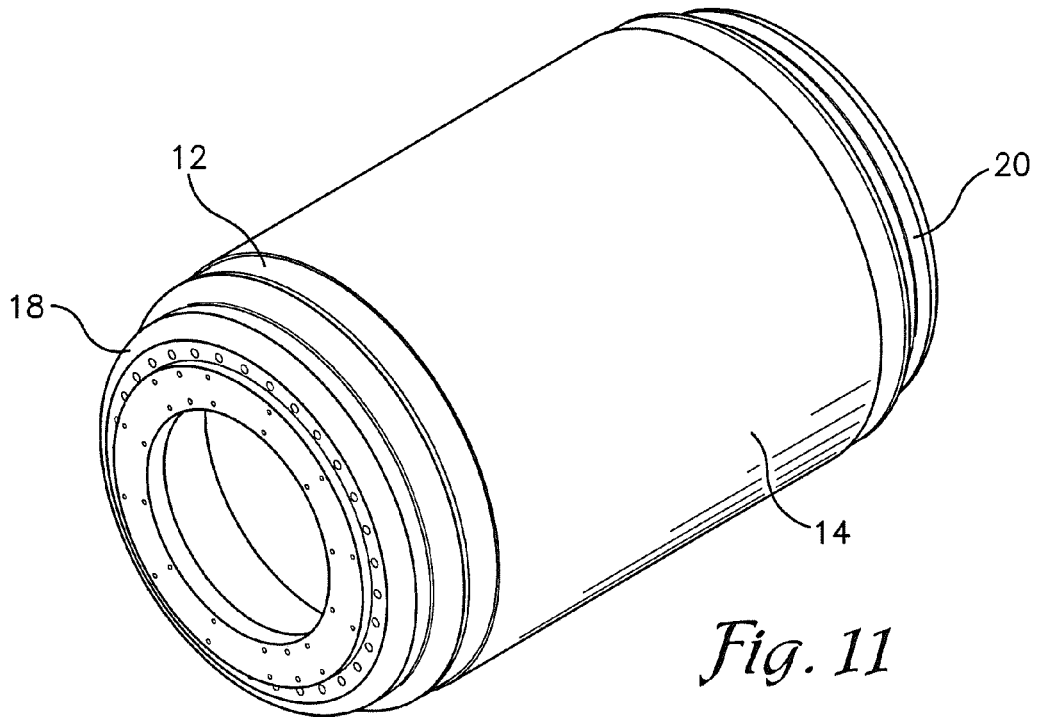
FIG. 11 is a perspective view of the SMP apparatus of FIG. 9 with composite material applied thereon and around the internal stiffeners.

Method 1500 may then comprise a step of applying a portion of the uncured composite material 14 onto the SMP apparatus 12, as depicted in block 1506 and illustrated in FIG. 11. Specifically, the composite material 14 may be applied onto both the SMP apparatus 12 and the internal stiffeners 24 resting in the cavities 40, such that at least a portion of the internal stiffeners 24 contact and may co-cure or co-bond to the composite material 14 of the fuselage 15, as later described herein. The uncured composite material 14 may be placed onto the SMP apparatus 12 using any method known in the art, such as automated fabric placement, automated fiber placement, automated filament winding, and/or hand lay-up. As mentioned above, the composite material 14 may comprise or be in the form of low temperature resin, high temperature resin, toughened resin, prepreg, wet processed fiber, dry fiber, continuous fiber, discontinuous fiber, chopped fiber, glass, KEVLAR, carbon, and/or core. In some embodiments of the invention, a barrier and/or release agent may be placed between the SMP apparatus 12 and the composite material 14, such that they may be more easily separated after cure of the composite material 14. The barrier or release agent may be a film, a plastic, etc. The barrier or release agent may also, for example, have a bondable side and a release side.

The method 1500 of fabricating the fuselage 15 may then comprise placing the SMP apparatus 12 and the uncured composite material 14 into the rigid external tool 28, as depicted in block 1508. Next, the method may include the steps of curing the composite material 14 via pressure and heat, as depicted in block 1510, while simultaneously inflating the SMP apparatus 12 to compress the composite material 14 during the curing process, as depicted in 1512. In some embodiments of the invention, the inflation pressure may be provided via the inner mandrel tool 16 and the heat may be elevated to a composite curing temperature above $T_g$. The inflation of the SMP apparatus 12 may compress the composite material 14 during the cure cycle, and compress the cured or uncured internal stiffeners 24 between the SMP apparatus 12 and the rigid external tool 28. Additionally or alternatively, inflation of the SMP apparatus 12 may apply pressure directly to one or more of the reinforcement inserts 26 such that the reinforcement inserts 26 apply compression force directly to portions of the internal stiffeners 24 positioned between the reinforcement inserts 26. The inflation of the SMP apparatus 12 may also compress the cured or uncured internal stiffeners 24 into the composite material 14 of the fuselage, thus co-bonding or co-curing the internal stiffeners 24 to the fuselage.

In another embodiment of the invention, a seal may be formed between the rigid external tool 28 and the SMP apparatus 12 using mechanical seals, adhesive, or any known method for sealing peripheral portions of the SMP apparatus 12 to the rigid external tool 28. The rigid external tool 28 may be vented to further enhance the differential pressure created by autoclave during curing of the composite material 14. This may eliminate the need for an airtight seal with the inner mandrel tool 16. Note that other methods of compressing the SMP apparatus 12 against the composite material 14 may be used without departing from the scope of the invention. Furthermore, the heat and pressure differential described herein may be provided by autoclave (not shown) or any other combination of known heating and pressure techniques for fabricating composite parts.

Once the composite material 14 is cured, the method 1500 may comprise removing inflation pressure from within the SMP apparatus 12, as depicted in block 1514, and extracting the SMP apparatus 12 out from within the resulting fuselage, as depicted in block 1516. The SMP apparatus 12 may contract around the inner mandrel tool 16 once the pressure is removed, while the heat remains above $T_g$. For example, vacuum may be applied from within the inner mandrel tool 16 to suction the SMP apparatus 12 back against the inner mandrel tool 16. As illustrated in FIG. 12, the SMP apparatus 12 is thereby withdrawn away from the cured composite material 14. Thus, extracting the inner mandrel tool 16 from within the cured fuselage and internal stiffeners 24 results in extraction of the SMP apparatus 12 which contracts against the inner mandrel tool 16 after inflation pressure is removed.

Finally, the method 1500 may comprise the steps of removing the reinforcement inserts 26 from the cured internal stiffeners 24, as depicted in block 1518, and extracting the fuselage from the rigid external tool 28, as depicted in block 1520. For example, portions of the rigid external tool 28 may be mechanically disconnected from each other, allowing the fuselage 15 and its integrated internal stiffeners 24 to be lifted out of the rigid external tool 28.

In an alternative embodiment of the invention, the SMP apparatus 12 may remain rigid during cure. For example, once the uncured composite material 14 is applied onto the SMP apparatus 12, they may both be vacuum bagged or sealed within a flexible, impermeable material (not shown) and cured. In this alternative embodiment, the cure temperature of the composite material 14 may be less than the temperature $T_g$ at which the SMP apparatus 12 begins to become malleable, such that the SMP apparatus 12 remains rigid throughout the cure cycle. So instead of using the SMP apparatus 12 as a bladder during cure, the SMP apparatus 12 may remain rigid during cure, with compression force of the vacuum bag or impermeable material being used to co-cure or co-bond the composite material 14 of the fuselage and the internal stiffeners 24. Then, once the composite material 14 is cured, the vacuum bag may be removed from around the resulting fuselage, and the temperature of the SMP apparatus 12 may be raised above $T_g$ so that the SMP apparatus 12 may be malleable and/or contract toward its memory shape to be removed from within the fuselage.

Fabricating Stiffeners with the SMP Apparatus

Figure 16:
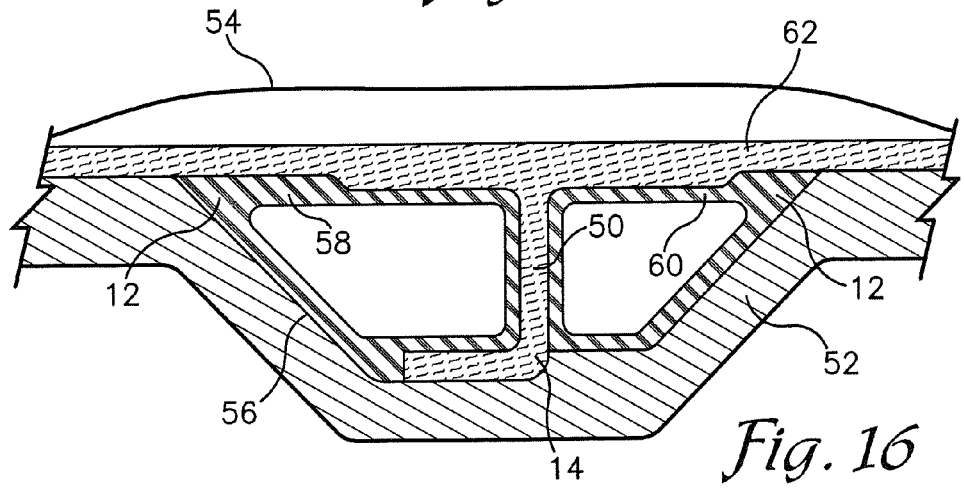
FIG. 16 is a fragmentary cross-sectional view of a J-stringer being formed between two SMP apparatuses and a rigid molding tool, each constructed in accordance with an embodiment of the present invention.
Figure 17:
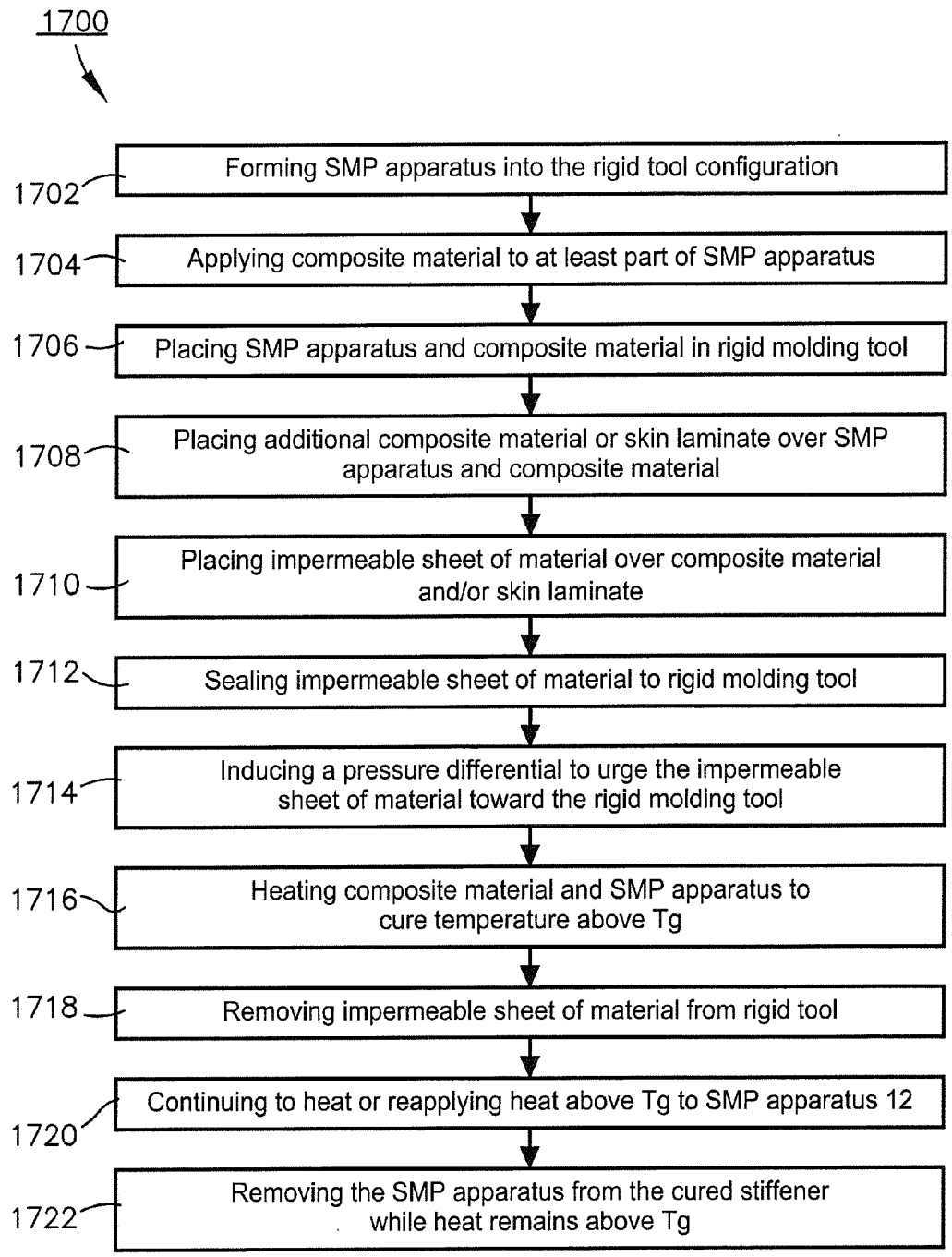
FIG. 17 is a flow chart of a method for fabricating a composite stiffener using the SMP apparatus in accordance with an embodiment of the present invention.

Another embodiment of the invention, as best illustrated in FIGS. 16-17, is a method of fabricating a stiffener 50, such as the internal stiffeners 24, described above, a frame, and/or a stringer. In this embodiment of the invention, the method may be implemented using the SMP apparatus 12, a rigid molding tool 52, and an impermeable sheet of material 54 such as a vacuum bag to fabricate the stiffener, as illustrated in FIG. 16.

The SMP apparatus 12 illustrated in FIG. 16 may have the same traits and characteristics as the SMP apparatus 12 described for the embodiment of the invention illustrated in FIGS. 1-2. Furthermore, the SMP apparatus 12 may be formed into a desired rigid tool configuration using any desired method, such as the techniques described above. In some embodiments of the invention, the SMP apparatus 12 may be cast with a memory shape substantially corresponding to a desired shape or contour of at least one surface of the resulting stiffener 50. For example, if the stiffener 50 to be fabricated is a stringer with a trapezoidal cross-section, then the SMP apparatus 12 may be cast with a memory shape having a substantially trapezoidal cross-section. Alternatively, the SMP apparatus 12 may be cast into any elongated shape and may later be inserted into a hollow mold, heated, and inflated therein, then cooled and hardened into the shape provided by the hollow mold.

The rigid molding tool 52 may be similar or identical in functionality and design to the rigid external tool 28 described above and may be made of any material capable of remaining rigid during cure of the composite material 14, such as steel. Alternatively, the rigid molding tool 52 may be made of an SMP material configured to remain rigid during cure of the composite material 14. For example, the rigid molding tool 52 could be the SMP apparatus 12 illustrated in FIG. 10a and the $T_g$ of the SMP apparatus 12 illustrated in FIG. 16 may differ from the $T_g$ of the rigid molding tool 52 in this alternative embodiment of the invention. The rigid molding tool 52 may be configured to form at least one desired outer surface of the stiffener. For example, the rigid molding tool 52 may comprise a cavity 56 formed therein into which the uncured composite material 14 may be placed, forming at least one wall of the stiffener 50. As illustrated in FIG. 16, the cavity 56 may be a trough with a bottom and two side walls extending at non-90° angles from the bottom.

The impermeable sheet of material 54 may be a vacuum bag or any other flexible, impermeable material which may be sealed to the rigid molding tool 52 and/or the SMP apparatus 12. For example, the impermeable sheet of material 54 may be placed over the composite material 14 and sealed to the rigid molding tool 52, creating a substantially air-tight seal between impermeable sheet of material 54 and the rigid molding tool 52. The impermeable sheet of material 54 may also comprise a vacuum port (not shown) extending therethrough to allow for the evacuation and venting of air. When air is removed from between the rigid molding tool 52 and the impermeable sheet of material 54, the impermeable sheet of material 54 may compress the composite material 14 placed therebetween. Additionally or alternatively, the SMP apparatus 12 may be pressurized by autoclave and/or compressed gas, thus inflating the SMP apparatus 12 toward the rigid molding tool 52 and the impermeable sheet of material 54. Furthermore, a caul sheet (not shown) may be placed between the impermeable sheet of material 54 and the composite material 14 to better control contour and surface finish of the composite material 14. Other composite bagging techniques known in the art may also be used herein without departing from the scope of the invention.

In an alternative embodiment of the invention, the impermeable sheet of material 54 may be replaced with a permeable sheet of material which may be placed over the composite material 14 and the SMP apparatus 12. In this embodiment of the invention, the permeable sheet of material may be physically pressed toward the composite material 14 while pressure from the SMP apparatus 12 during cure compresses the composite material 14. In yet another alternative embodiment of the invention, the impermeable sheet of material 54 may be replaced with a rigid covering tool which may be permeable or impermeable and may be clamped, pressed toward, or mechanically fixed to the rigid molding tool 52 and over the composite material 14.

The flow chart of FIG. 17 depicts the steps of an exemplary method 1700 for fabricating a composite stiffener using the SMP apparatus 12. In some alternative implementations, the functions noted in the various blocks may occur out of the order depicted in FIG. 17. For example, two blocks shown in succession in FIG. 17 may in fact be executed substantially concurrently, or the blocks may sometimes be executed in the reverse order depending upon the functionality involved.

The method 1700 of fabricating the stiffener 50 using the SMP apparatus 12 may comprise the steps of forming the SMP apparatus 12 into the rigid tool configuration, as depicted in block 1702, and then applying at least a portion of the SMP apparatus 12 with the composite material 14, as depicted in block 1704. In some embodiments of the invention, the rigid tool configuration of the SMP apparatus 12 may correspond with an internal shape and/or angle of the stiffener 50 to be formed thereon. In other embodiments of this invention, the material 14 may be placed onto or wrapped onto the SMP apparatus 12 first, and then the SMP apparatus 12 may be formed into the rigid tool configuration, using any molding techniques described herein or known in the art.

Then the method 1700 may comprise placing the SMP apparatus 12 applied with the composite material 14 into the cavity 56 of the rigid molding tool 52, as depicted in block 1706. Alternatively, the composite material 14 may be laid in the cavity 56 of the rigid molding tool 52 and then the SMP apparatus 12 in the rigid tool configuration may be placed on top of the composite material 14 within the cavity 56 of the rigid molding tool 52.

However, a number of techniques may be employed to place the composite material 14 in contact with the SMP apparatus 12, and to place both in the cavity of the rigid molding tool 52, without departing from the scope of this invention. Furthermore, in some embodiments of the invention, more than one SMP apparatus may be used to fabricate the stiffener 50. For example, as illustrated in FIG. 16, two SMP apparatuses 58,60 having the properties of the SMP apparatus 12, as described above, are shaped or molded to support opposing surfaces of the composite material 14 to fabricate the stiffener 50 in a J-stringer configuration. Specifically, the stiffener 50 may be an elongated stiffener having a substantially J-shaped cross-section. The composite material 14 may be positioned between the two SMP apparatuses 58,60 and the rigid molding tool 52 as illustrated in FIG. 16 using hand lay-up or any other methods known in the art. Then, a skin laminate 62 may be placed over the two SMP apparatuses 58,60, contacting a top end of the composite material 14 fabricating the J-shaped cross-section of the stiffener 50. In this embodiment of the invention, the skin laminate 62 and the composite material 14 may be co-bonded together, as later described herein.

Therefore, in general, the method 1700 may comprise the step of placing another layer of composite material or the skin laminate 62 over the SMP apparatus 12, contacting at least a portion of the composite material 14 resting within the cavity 56 of the rigid molding tool 52, as depicted in block 1708. Next, the method may comprise placing the impermeable sheet of material 54 over the composite material 14 and/or the skin laminate 62, as depicted in block 1710, and sealing the impermeable sheet of material 54 to the rigid molding tool 52, as depicted in block 1712, thereby forming an airtight boundary around the composite material 14. The airtight boundary may also be formed over and/or against the SMP apparatus 12, while leaving at least one vent opening (not shown) for the SMP apparatus 12, such that space within the SMP apparatus 12 remains exposed to atmosphere outward of the airtight boundary.

Then the method 1700 may comprise a step of inducing a pressure differential to urge the impermeable sheet of material 54 toward the rigid molding tool 52, as depicted in block 1714. For example, this step may involve removing air from between the impermeable sheet of material 54 and the rigid molding tool 52, such as by way of vacuum, which may press the impermeable sheet of material 54 toward or against the composite material 14 and/or the skin laminate 62. Following or simultaneous to the step depicted in block 1714, the method 1700 may comprise the step of heating the composite material 14 and the SMP apparatus 12 to a temperature for curing the composite material 14, as depicted in block 1716. The composite cure temperatures may be greater than $T_g$, such that the SMP apparatus 12 may become malleable and may push or inflate outward, pressing against the composite material 14. The SMP apparatus 12 may therefore behave similar to an internal vacuum bag. Additionally or alternatively, gas or air pressure may be introduced into the SMP apparatus to cause or assist its inflation outward for compressing the composite material 14.

In some alternative embodiments of the invention, at least one of the SMP apparatuses 58,60 may be replaced with a rigid tool of the same shape. In other alternative embodiments of the invention, both of the SMP apparatuses 58,60 may be replaced with rigid tools of the same shape and the rigid molding tool 52 may be replaced with the SMP apparatus 12 of FIG. 10a. In general, any combination of SMP apparatuses and rigid molding tools may be used to form the composite parts described and depicted herein.

Once the composite material 14 is cured, the method may comprise the steps of removing the impermeable sheet of material 54 from the rigid molding tool 52, as depicted in block 1718. In some embodiments of the invention, the method 1700 may also comprise either continuing to heat or reapplying heat to the SMP apparatus 12, as depicted in block 1720, such that the SMP apparatus 12 may be contracted or otherwise urged away from the cured stiffener 50. If gas or air pressure was introduced to assist in inflation of the SMP apparatus 12, this pressure may also be removed. The SMP apparatus 12 may naturally contract back toward its original memory shape, remaining soft and malleable until cooled. Therefore, the method 1700 may include a step of removing the SMP apparatus 12 from the cured composite material 14 or stiffener 50 while it is in its soft, malleable state, as depicted in block 1722. Alternatively, the SMP apparatus 12 may be contracted or urged away from the cured stiffener 50 while in its malleable state, but then cooled and hardened prior to being removed from within the cured stiffener 50.

Note that, once removed from the cured stiffener 50, the SMP apparatus 12 may then be reconfigured into any desired rigid tool configuration within the strain limitations of the SMP apparatus 12 and reused to make another stiffener. In general, the SMP apparatus 12 is reconfigurable and reusable. Conversely, inner mandrel bags known in the art cannot be reused or do not offer the desired durability and are more prone to failure. Inner mandrel bags also do not have the necessary stiffness to be used as a lay-up tool for applying the composite material 14 thereto. Specifically, other types of mandrels used in traditional stiffener-forming applications are often required to be cut out or washed out of the cured stiffener and are therefore also not reusable. Advantageously, the SMP apparatus 12 may be used as both the rigid lay-up tool for composite material lay-up and as an internal bag or bladder during curing of the composite material 14, and may then be removed and reused for multiple cycles.

Although the invention has been described with reference to the preferred embodiment illustrated in the attached drawing figures, it is noted that equivalents may be employed and substitutions made herein without departing from the scope of the invention as recited in the claims. For example, any instance of vacuum or inflation force being applied inward or outward of the SMP apparatus 12, as described herein, is merely exemplary and can be replaced with any techniques known in the art for creating a pressure differential capable of urging the SMP apparatus 12 toward a desired mold and/or composite material 12. Additionally, while various shapes, configurations, and tooling have been described herein to shape the SMP apparatus 12 into a desired rigid tool configuration, note that any mold or combination of molds and rigid tooling may be used to define a shape of the SMP apparatus 12 using one or more of the method steps described herein.

Furthermore, though the Figures and example embodiments provided herein describe fabricating composite parts for aircrafts, the forming tools and methods described herein may be used to fabricate composite parts for automobiles, boats, sporting goods, and the like without departing from the scope of the invention.

Having thus described various embodiments of the invention, what is claimed as new and desired to be protected by Letters Patent includes the following:

1. A method of fabricating a composite part, the method comprising:
   applying composite material to at least a portion of a shape memory polymer (SMP) apparatus;
   triggering a change in modulus of the SMP apparatus such that the SMP apparatus changes from a rigid state to a malleable state, wherein the change in modulus is triggered by applying at least one of temperature change, an electric current, water, and light to the SMP apparatus;
   heating the composite material to a composite material cure temperature; and
   inducing a pressure differential that drives the SMP apparatus, in its malleable state, toward the composite material during cure to compress the composite material against a rigid surface.

2. The method of claim 1, further comprising the steps of:
   equalizing the pressure differential after the composite material is cured or inducing a pressure differential sufficient to urge the SMP apparatus away from the cured composite material; and
   removing the SMP apparatus from the cured composite material.

3. The method of claim 1, wherein the step of inducing a pressure differential comprises applying pressure in a range of 1-150 psig to the SMP apparatus to press it toward the rigid surface.

4. The method of claim 1, further comprising shaping the SMP apparatus into a desired rigid tool configuration while the SMP apparatus is in its malleable state and triggering the SMP apparatus to change back to its rigid state in the desired rigid tool configuration prior to applying composite material to the SMP apparatus.

5. The method of claim 1, wherein heating the composite material and triggering the change in modulus is performed simultaneously by heating the composite material and SMP apparatus to a cure temperature equal to or greater than $T_g$, wherein the SMP apparatus is configured to begin to change to its malleable state at $T_g$.

6. The method of claim 5, wherein $T_g$ is between 100° F. and 200° F.

7. The method of claim 5, wherein $T_g$ is between 200° F. and 400° F.

8. A method of fabricating a composite part, the method comprising:
applying composite material onto a shape memory polymer (SMP) apparatus in a rigid tool configuration;
placing the composite material and the SMP apparatus within or proximate to a rigid external tool configured to define a surface of the composite part;
heating the composite material and SMP apparatus to a composite material cure temperature above a temperature $T_g$ at which the SMP apparatus begins to become malleable; and
inducing a pressure differential sufficient to drive the SMP apparatus toward the composite material before and/or during cure to compress the composite material against the rigid external tool.

9. The method of claim 8, further comprising the steps of:
equalizing the pressure differential after the composite material is cured or inducing a pressure differential to urge the SMP apparatus away from the cured composite material; and
removing the SMP apparatus from within the cured composite material.

10. The method of claim 8, wherein $T_g$ is between 100° F. and 200° F.

11. The method of claim 8, wherein $T_g$ is between 200° F. and 300° F.

12. The method of claim 8, wherein $T_g$ is between 300° F. and 400° F.

13. The method of claim 8, wherein the step of inflating the SMP apparatus comprises applying pressure in a range of 1-150 psig to the SMP apparatus.

14. The method of claim 8, further comprising forming the SMP apparatus into the rigid tool configuration prior to applying composite material to the SMP apparatus by heating the SMP apparatus to a temperature above $T_9$, inflating the SMP apparatus within a mold, cooling the SMP apparatus to a temperature below $T_g$, and then removing the SMP apparatus from the mold.

* * * * *